(12) United States Patent
Brown et al.

(10) Patent No.: US 7,489,243 B2
(45) Date of Patent: Feb. 10, 2009

(54) SYSTEM AND METHOD FOR DETECTING TRANSPONDERS USED WITH PRINTER MEDIA

(75) Inventors: Anthony R. Brown, Grayslake, IL (US); Karl Torchalski, Arlington Heights, IL (US); William Shuff, Glenview, IL (US); Matt Ream, Naperville, IL (US); Eugene Borisov, Buffalo Grove, IL (US)

(73) Assignee: ZIH Corp., Hamilton (BM)

( * ) Notice: Subject to any disclaimer, the term of this patent is extended or adjusted under 35 U.S.C. 154(b) by 135 days.

(21) Appl. No.: 11/461,122

(22) Filed: Jul. 31, 2006

(65) Prior Publication Data
US 2007/0176781 A1    Aug. 2, 2007

Related U.S. Application Data

(63) Continuation of application No. 10/981,967, filed on Nov. 5, 2004, now Pat. No. 7,190,270.

(51) Int. Cl.
*G08B 13/14* (2006.01)
(52) U.S. Cl. .............. 340/572.1; 340/572.4; 340/572.8; 235/432
(58) Field of Classification Search .............. 340/572.1, 340/572.4, 572.7, 572.8, 686.1, 686.6, 539.21; 235/432, 449, 451
See application file for complete search history.

(56) References Cited

U.S. PATENT DOCUMENTS

| | | |
|---|---|---|
| 4,509,039 A | 4/1985 | Dowdle |
| 5,278,571 A | 1/1994 | Helfrick |
| 5,369,381 A | 11/1994 | Gamand |
| 5,373,266 A | 12/1994 | Lenzing et al. |
| 5,777,586 A | 7/1998 | Luxon et al. |

(Continued)

FOREIGN PATENT DOCUMENTS

DE    93 21 478 U1    10/1998

(Continued)

OTHER PUBLICATIONS

*Microstrip Lines and Slotlines*, K. C. Gupta, Artech House Publishers, 1996.

(Continued)

*Primary Examiner*—Toan N Pham
(74) *Attorney, Agent, or Firm*—Alston & Bird LLP

(57) ABSTRACT

A calibration apparatus for determining a location of a transponder supported by a printer media. The calibration apparatus uses a transceiver to attempt to read, write or otherwise communicate with the transponder. Controller logic of the calibration apparatus uses successful and unsuccessful attempts to communicate to determine the location of the transponder. For example, the controller may be configured to move the media in increments, each of the increments associated with a successful or unsuccessful attempt to communicate with the transponder. The successful attempts, and their relative media positions, are correlated with the position of the transponder. Also, the controller may be configured to use different power levels for the transceiver and its one or more couplers to determine which power levels are required to successfully communicate with the transponder. These power levels are correlated with characteristics of the performance of the transponder to determine its distance from the antenna/coupler.

23 Claims, 15 Drawing Sheets

U.S. PATENT DOCUMENTS

| | | |
|---|---|---|
| 5,838,253 A | 11/1998 | Wurz et al. |
| 6,104,291 A | 8/2000 | Beauvillier et al. |
| 6,246,326 B1 | 6/2001 | Wiklof et al. |
| 6,267,521 B1 | 7/2001 | Lodwig et al. |
| 6,392,544 B1 | 5/2002 | Collins et al. |
| 6,409,401 B1 | 6/2002 | Petteruti et al. |
| 6,848,616 B2 | 2/2005 | Tsirline et al. |
| 6,938,976 B2 | 9/2005 | Siwinski et al. |
| 6,969,134 B2 | 11/2005 | Hohberger et al. |
| 2001/0029857 A1 | 10/2001 | Heredia et al. |
| 2003/0067504 A1 | 4/2003 | Spurr et al. |
| 2004/0178267 A1 | 9/2004 | Tsirline et al. |
| 2006/0055721 A1 | 3/2006 | Burdette et al. |

FOREIGN PATENT DOCUMENTS

| | | |
|---|---|---|
| EP | 0 414 628 A2 | 2/1991 |
| EP | 1 233 367 A2 | 8/2002 |
| GB | 2 321 551 A | 7/1998 |
| JP | 2003132330 | 5/2003 |
| WO | WO 2005/022445 | 3/2005 |

OTHER PUBLICATIONS

*The Basics of Print Reciprocal Dividers/Combiners*, L.G. Maloratsky, Microwave Journal, Sep. 2000, pp. 1-15.

*Reviewing the Basics of Suspended Striplines*, L.G. Maloratsky, Microwave Journal, Oct. 2002.

*Reviewing the Basics of Microstrip Lines*, L.G. Maloratsky, Microwaves & RF, Mar. 2000, pp. 79-88.

*Improve BPF Performance With Wiggly Coupled Lines*, L.G. Maloratsky, Microwaves & RF, Apr. 2002, pp. 53-62.

*Design Regular-And Irregular-Print Coupled Lines*, L.G. Maloratsky, Microwaves & RF, Sep. 2000, pp. 97-106.

*Couplers Shrink HF/VHF/UHF Designs*, L.G. Maloratsky, Microwaves & RF, Jun. 2000, pp. 93-96.

*Understand the Basics of Microstrip Directional Couplers*, L.G. Maloratsky, Microwaves & RF, Feb. 2001, pp. 79-94.

*Leaky Fields on Microstrip*, L.O. McMillan et al., Progress in Electromagnetics Research, PIER 17, 1997, pp. 323-377.

International Search Report, PCT International Search Report mailed Apr. 6, 2006 for PCT/US2005/039895 (Filed Nov. 3, 2005).

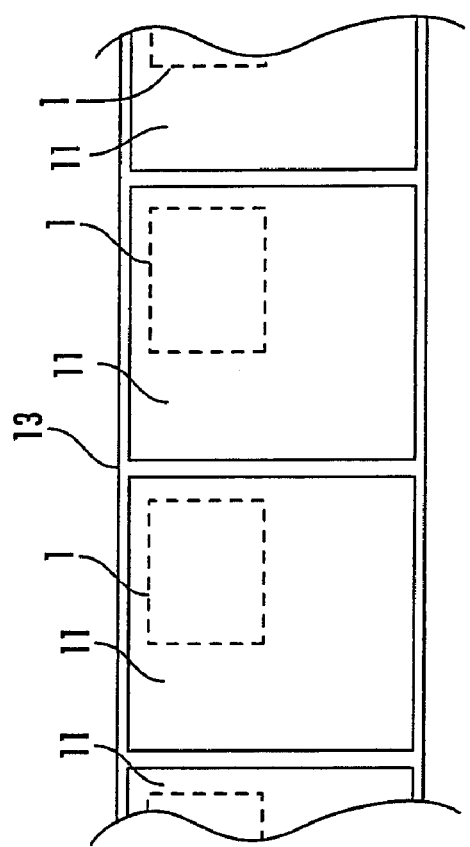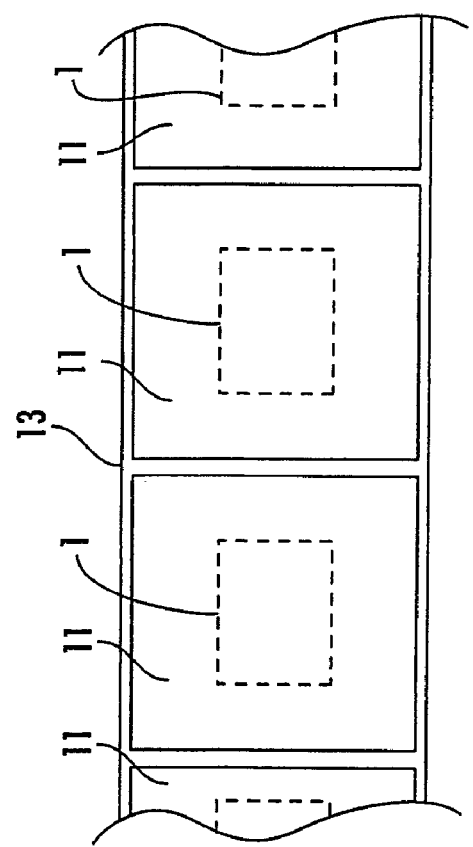

| TRANSPONDER TYPE | READ POWER LEVELS | | | WRITE POWER LEVELS | | |
|---|---|---|---|---|---|---|
| 1 | $P_{R1}$ | $P_{R2}$ | $P_{R3}$ | $R_{W1}$ | $R_{W2}$ | $R_{W3}$ |
| 2 | $P_{R1}'$ | $P_{R2}'$ | $P_{R3}'$ | $R_{W1}'$ | $R_{W2}'$ | $R_{W3}'$ |
| 3 | $P_{R1}''$ | $P_{R2}''$ | $P_{R3}''$ | $R_{W1}''$ | $R_{W2}''$ | $R_{W3}''$ |

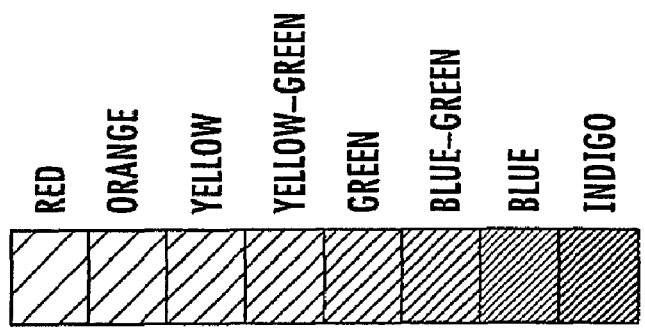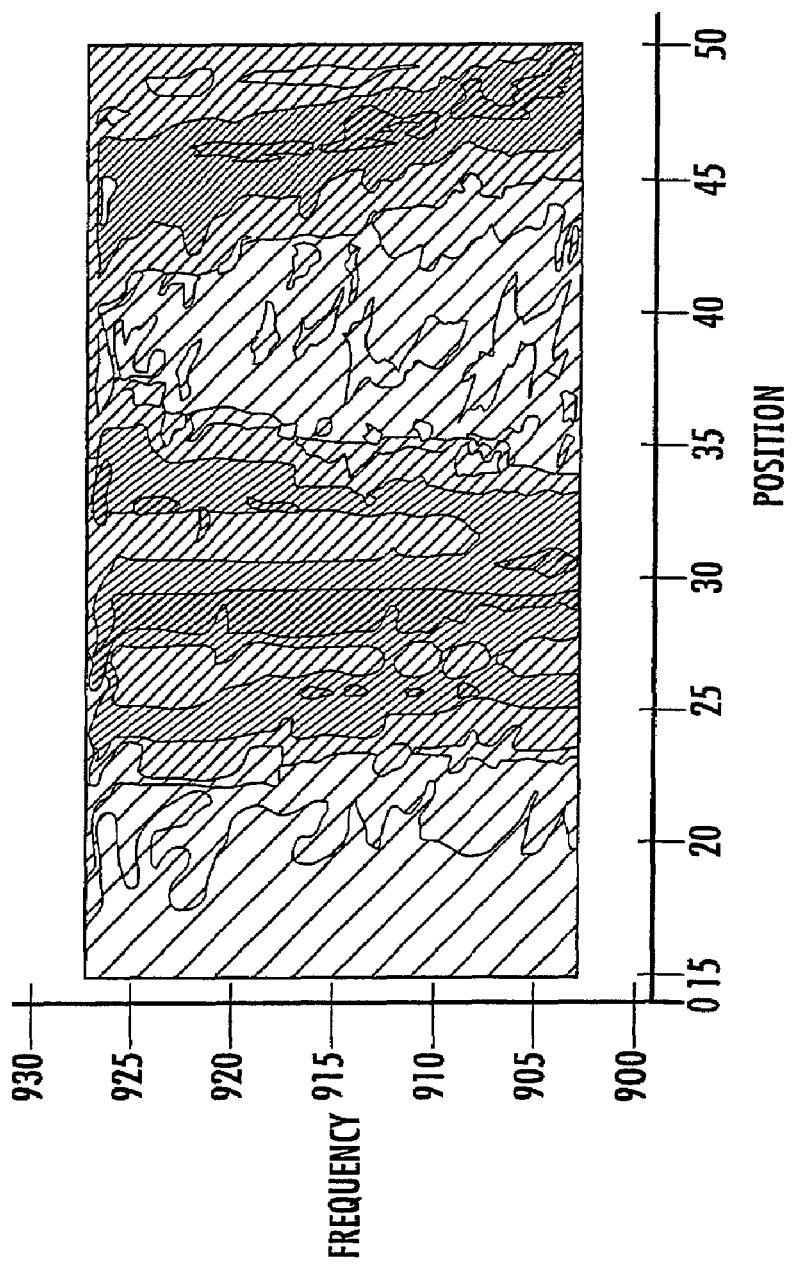
FIG. 12

```
Begin
621, ,
620, ,
619, ,
618, ,
617, ,
616,R,W
615,R,W
614,R,W
613,R,W
612,R,W
611,R,W
610,R,W
609,R,W
608,R,W
607,R,W
606,R,W
605,R,W
604,R,W
603,R,W
602,R,W
601,R,W
600,R,W
599,R,W
598,R,W
597,R,W
596,R,W
595,R,W
594,R,W
593,R,W
592,R,W
591,R,W
590,R,W
589,R,W
588,R,W
587,R,W
586,R,W
585,R,W
584,R,
583, ,
582, ,W
581,R,W
580,R,W
579,R,W
578,R,W
577,R,W
576,R,W
575,R,W
```

SYSTEM AND METHOD FOR DETECTING TRANSPONDERS USED WITH PRINTER MEDIA

CROSS-REFERENCE TO RELATED APPLICATIONS

This application is a continuation of U.S. application Ser. No. 10/981,967, filed Nov. 5, 2004, now U.S. Pat. No. 7,190,270 which is hereby incorporated herein in its entirety by reference.

BACKGROUND OF THE INVENTION

1. Field of the Invention

The present invention is related to dispensing of printer media with radio frequency identification (RFID) tags and, more particularly, to printing on printer media with the RFID tags in combination with writing to, and reading from, the RFID tags.

2. Description of Related Art

UHF radio frequency identification (RFID) technology allows wireless data acquisition and or transmission from and or to active (battery powered) or passive transponders using a backscatter technique. To communicate with, i.e., "read" from and or "write" commands and/or data to a transponder, the transponder is exposed to an RF electromagnetic field by the transceiver that couples with and energizes (if passive) the transponder through electromagnetic induction and transfers commands and data using a predefined "air interface" RF signaling protocol.

When multiple passive transponders are within the range of the same RF transceiver electromagnetic field they will each be energized and attempt to communicate with the transceiver, potentially causing errors in "reading" and or "writing" to a specific transponder in the reader field. Anti-collision management techniques exist to allow near simultaneous reading and writing to numerous closely grouped transponders in a common RF electromagnetic field. However, anti-collision management increases system complexity, cost and delay response. Furthermore, anti-collision management is "blind" in that it cannot recognize where a specific transponder being processed is physically located in the RF electromagnetic field, for example, which transponder is located proximate the print head of a printer-encoder.

One way to prevent errors during reading and writing to transponders without using anti-collision management is to isolate a specific transponder of interest from nearby transponders. Previously, isolation of transponders has used RF-shielded housings and/or anechoic chambers through which the transponders are individually passed for personalized exposure to the interrogating RF field. This requires that the individual transponders have cumbersome shielding or a significant spatial separation.

RFID printers-encoders have been developed which are capable of on-demand printing on labels, tickets, tags, cards or other media with which a transponder is attached or embedded. These printer-encoders have a transceiver for on-demand communication with the transponder on the individual media to read and/or store data into the attached transponder. For the reasons given, it is highly desirable in many applications to present the media on rolls or other format in which the transponders are closely spaced. However, close spacing of the transponders exacerbates the task of serially communicating with each individual transponder without concurrently communicating with neighboring transponders on the media. This selective communication exclusively with an individual transponder is further exacerbated in printers-encoders designed to print on the media in or near the same space as the transponder is positioned when being interrogated.

When transponders are supplied attached to a carrier substrate, for example in RFID-attached labels, tickets, tags or other media supplied in bulk rolls, Z-folded stacks or other format, an extra length of the carrier substrate is required to allow one transponder on the carrier substrate to exit the isolated field area before the next transponder in line enters it. The extra carrier substrate increases materials costs and the required volume of the transponder media bulk supply for a given number of transponders. Having increased spacing between transponders may also slow overall printer-encoder throughput.

When transponders of different sizes and form factors are processed, the RF shielding and or anechoic chamber configuration will also require reconfiguration, adding cost, complexity and reducing overall productivity. In certain printer-encoders it is desired to print on transponder-mounting media in the same transponder operating region in which the transponder is being read from or written to. This may be very difficult to accomplish if the transponder also must be isolated in a shielded housing or chamber.

UHF transponders may operate in, for example, the 902-928 MHz band in the United States and other ISM bands designated in different parts of the world. For example, in FIG. 1 a conventional one-half wavelength "Forward Wave" microstrip prior art coupler 3 consisting of, for example, a rectangular conductive strip 5 upon a printed circuit board 7 having a separate ground plane 9 layer configured for these frequencies. One end of the conductive strip 5 is connected to transceiver 42 and the other end is connected through terminating resistor 8 to ground plane 9. The conductive strip 5 as shown in FIG. 1 has a significant width due to RF design requirements imposed by the need to create acceptable frequency response characteristics. This type of prior art coupler 3 has been used with UHF transponders that are relatively large compared to the extent of prior art coupler 3.

As shown by FIGS. 2a and 2b, recently developed transponders 1, designed for operation at UHF frequencies, have one dimension so significantly reduced, here for example a few millimeters wide, that they will be activated upon passage proximate the larger prior art coupler 3 by electromagnetic power leakage 10 concentrated at either side edge of the conductive strip 5 of prior art coupler 3. In FIG. 2A, the two leakage regions "A" and "B" defined by electro-magnetic power leakage 10 are small and relatively far apart, increasing system logical overhead and media conveyance positioning accuracy requirements. If the transponders 1 were placed close together, then multiple transponders 1 might be activated by the physically extensive one-half wavelength "Forward Wave" microstrip prior art coupler 3.

Thus the minimum required spacing of these transponders 1 to isolate them, and thus the minimum size of media 11 (assuming that they are embedded one per label or media 11 on carrier substrate 13) must be large relative to the size of the microstrip coupler 3. This creates issues for media suppliers by limiting the available space on the media 11 for transponder 1 placement and significantly increasing the necessary accuracy of the transponder 1 placement within and or under the printable media 11 and along the liner or carrier substrate 13. This also reduces the cost advantages of using the narrow dimensioned transponder(s) 1 within media 11, as the media 11 must be much larger than the transponder 1 to achieve adequate RF isolation.

Competition in the market for such "integrated" printer-encoder systems as well as other RFID interrogation systems has focused attention on the ability to interrogate with high spatial selectivity any transponder from a wide range of available transponders having different sizes, shapes and coupling characteristics as well as minimization of overall system, media size, and transponder costs. In addition, this high spatial selectivity and wide range of available transponders must be balanced with the need for the integrated printer-encoder system to be able to read and encode transponders of varying configurations at different locations on the media.

Therefore, it would be advantageous to have a printer-encoder system that is capable of reading and encoding a large number of types of transponders, and printing on media supporting the transponders. Further, it would be advantageous to have a printer-encoder system that can read and encode transponders with high selectivity regardless of their position on the printer media.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

FIG. 2b is a partial cut-away top schematic view of the prior art forward wave coupler and carrier substrate with embedded transponders of FIG. 2a;

FIG. 5b is a partial cut-away top schematic view of the coupler according to the invention and carrier substrate with embedded transponders of FIG. 5a;

FIGS. 6a and 6b are top views of carrier substrates illustrating different positions of the RFID transponders according to other embodiments of the present invention;

FIG. 12 is a two-dimensional chart corresponding to FIG. 11;

FIG. 15 is data file containing data generated using the logic of FIG. 13; and

BRIEF DESCRIPTION OF EXEMPLARY EMBODIMENTS

Figure 1:
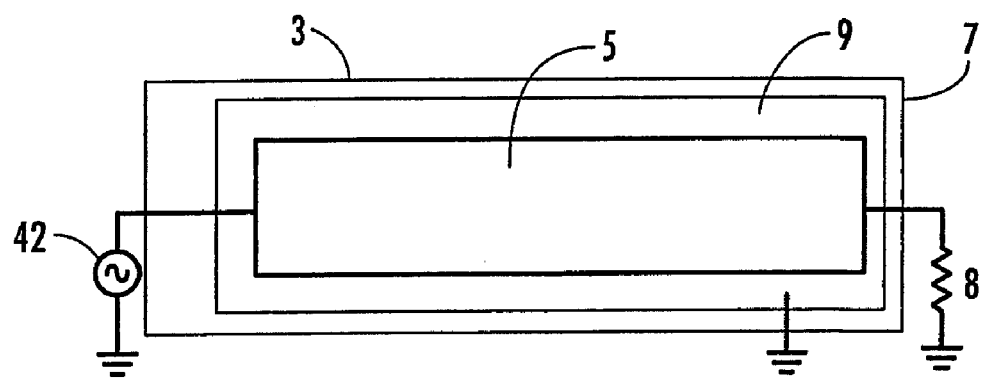
FIG. 1 is a top view of a prior art microstrip forward wave coupler.
Figure 2A:
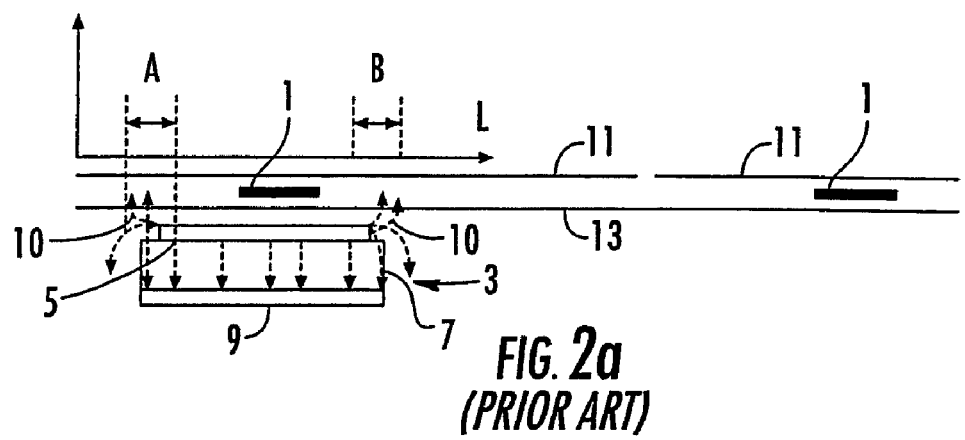
FIG. 2a is a simplified cut-away side view of a transponder-coupler structure using a prior art forward wave coupler as shown in FIG. 1, illustrating schematically locations where coupling with a narrow dimensioned transponder supplied in-line with other transponders on a carrier substrate may occur.
Figure 2B:
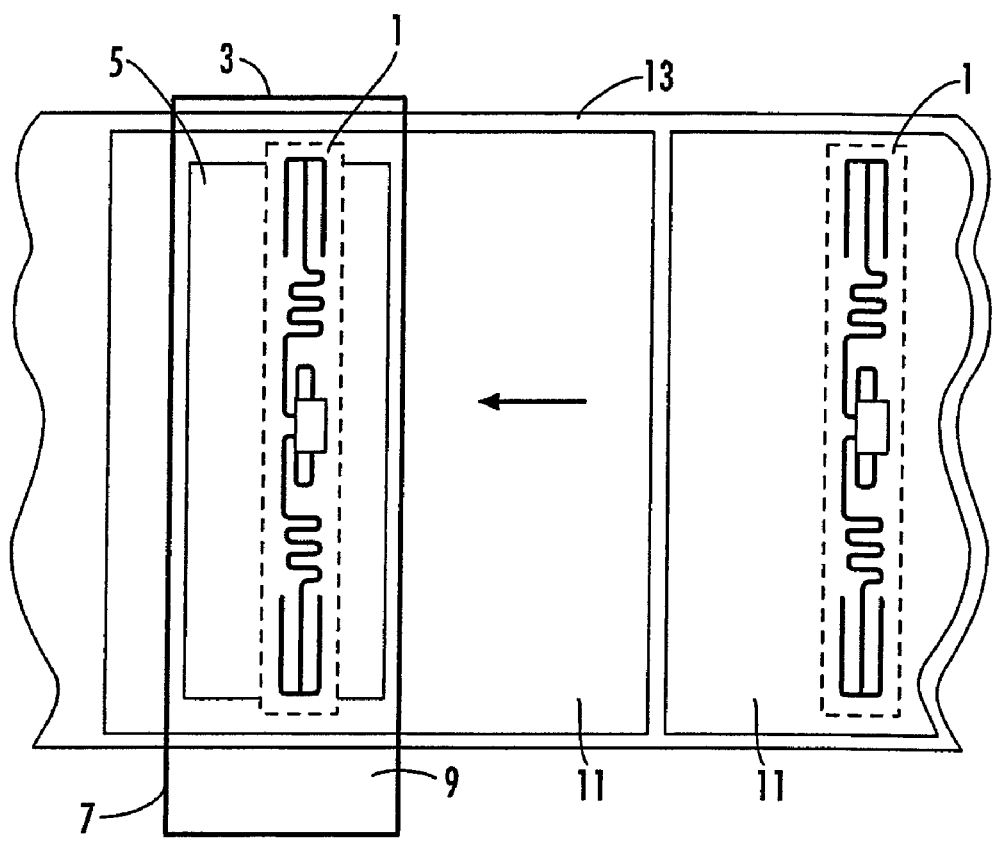

The present invention addresses the above needs and achieves other advantages by providing a calibration apparatus for determining a location of a transponder supported by a printer media. The calibration apparatus uses a transceiver to attempt to read, write or otherwise communicate with the transponder. Controller logic of the calibration apparatus uses successful and unsuccessful attempts to communicate to determine the location of the transponder. For example, the controller may be configured to move the media in increments, each of the increments being associated with a successful or unsuccessful attempt to communicate with the transponder. The successful attempts, and their relative media positions, are correlated with the position of the transponder. As another example, the controller may be configured to use different power levels for the transceiver and one or more antenna/couplers to determine which power levels are required to successfully communicate with the transponder. These power levels are correlated with characteristics of the performance of the transponder or a known start position from other media sensors to determine its distance from the coupler.

A calibration apparatus of one embodiment of the present invention includes a transceiver and a controller. The transceiver is configured to communicate with the transponder. Connected in communication with the transceiver is the controller which includes communication logic configured to operate the transceiver and determine when the transceiver has successfully and unsuccessfully communicated with the transponder. Location logic of the controller is configured to determine the location of the transponder relative to the transceiver based on at least one unsuccessful and one successful communication with the transponder.

The controller may be further configured to change a position of the media in between communications with the transponder. In this instance, the communication logic is further configured to record a plurality of consecutive successful communications by the transceiver. Each of the communications is associated with a changed position of the media, such as a different dot row of print. The location logic is configured to determine the location of the transponder using the consecutive successful communications. For example, the location logic can be configured to define a midpoint of the positions of the media of the consecutive successful communications as the location of the transponder.

In another aspect, the communication logic may be configured to record a second plurality of successful communications. The location logic is further configured to define the midpoint of the positions of the media at the first plurality of successful communications as the location of the transponder.

Transponder identification logic may also be included in the controller enabling it to detect the type of transponder it is attempting to communicate with and thereby control the transceiver accordingly. In addition, controller logic may be included for diagnosing problems with the apparatus, the transponder, the media, etc., using communication data from the transceiver.

In another embodiment, the communication logic is configured to supply power at different levels to the transceiver. A first one of the power levels is associated with the unsuccessful communication while a second one of the power levels is associated with the successful communication. The location logic is further configured to reference the power levels and the communications to characteristics (e.g., power needed for a response at a distance) of the type of transponder to determine the location of the transponder.

In a more particular example, the transceiver (wherein the term transceiver could refer to several transceivers collectively) can include a first and second antenna/coupler. Each of the antenna/couplers has a different position relative to the printer media and each of the couplers is configured to communicate with the transponder. Use of more than one coupler allows each of the couplers to be positioned so as to have compensating communication ranges, e.g., each coupler may be capable of communicating with the transponder at different ranges than the other coupler. Preferably, these ranges compensate for voids in communication ability of the couplers at certain distances from the transponder. Preferably, the couplers are spaced on opposite sides of the transponder, especially for near field couplers having limited ranges. The communication logic may be further configured to independently power the couplers so as to measure the communication response of the transponder together or alternatively.

The above-described ability of the present invention to determine the location of the transponder is advantageously independent of the media, allowing the media specifications to have a much wider transponder placement range. These systems can work on both small transponders placed on a small pitch, such as 1 inch labels, and large transponders. Combining calibration of the transponder location with the near field coupler has the advantage of locating the transponder even in the presence of nearby transponders.

Additional advantages of the use of varying power and other parameters include the media and transponder not needing to move during calibration, allowing communication with the transponder in its native (ready for printing) rest position. This obviates the need for split label printing, wherein printing is stopped at the location of the transponder to encode the transponder, introducing possible artifacts into the printing. Also, transponder placements out of specification in two dimensions (along the print length and print width), as well as possible media flutter in the z direction may be detected.

DETAILED DESCRIPTION OF THE INVENTION

The present invention now will be described more fully hereinafter with reference to the accompanying drawings, in which some, but not all embodiments of the invention are shown. Indeed, this invention may be embodied in many different forms and should not be construed as limited to the embodiments set forth herein; rather, these embodiments are provided so that this disclosure will satisfy applicable legal requirements. Like numbers refer to like elements throughout.

The present invention includes an apparatus and method which enables an RFID transceiver (sometimes termed herein an "interrogator") to locate and communicate selectively and exclusively with a single UHF transponder 1 when one or more other similar transponders are in close proximity, without the need for a predetermined knowledge of the location of the transponder, physical isolation of the transponder or cumbersome shielded housings or chambers for the transponder.

The invention is useful in the reading and or data loading of UHF transponders, for example on an assembly line, in distribution centers or warehouses where on-demand RFID labeling is required, and in a variety of other applications. In many applications a transponder or a number of transponders are mounted or embedded on or in a label, ticket, tag, card or other media carried on a liner or carrier. It is often desirable to be able to print on the media before, after, or during communication with a transponder. Although this invention is disclosed here in a specific embodiment for use with a direct thermal or thermal transfer printer, it may also be used with any type of spatially selective RFID interrogation device or other types of printers using other printing technologies, including inkjet, dot-matrix, and electro-photographic methods.

Other frequencies of operation for the RF tag protocols herein include those in the 13.56 MHz (HF) space as well as UHF, but the present invention as described herein is not meant to be limited to any particular protocol.

In some applications a print station may be at a distance from the RFID transceiver; in others it may be necessary to accomplish the print function in the same target space occupied by the transponder when it is being interrogated.

Figure 3:
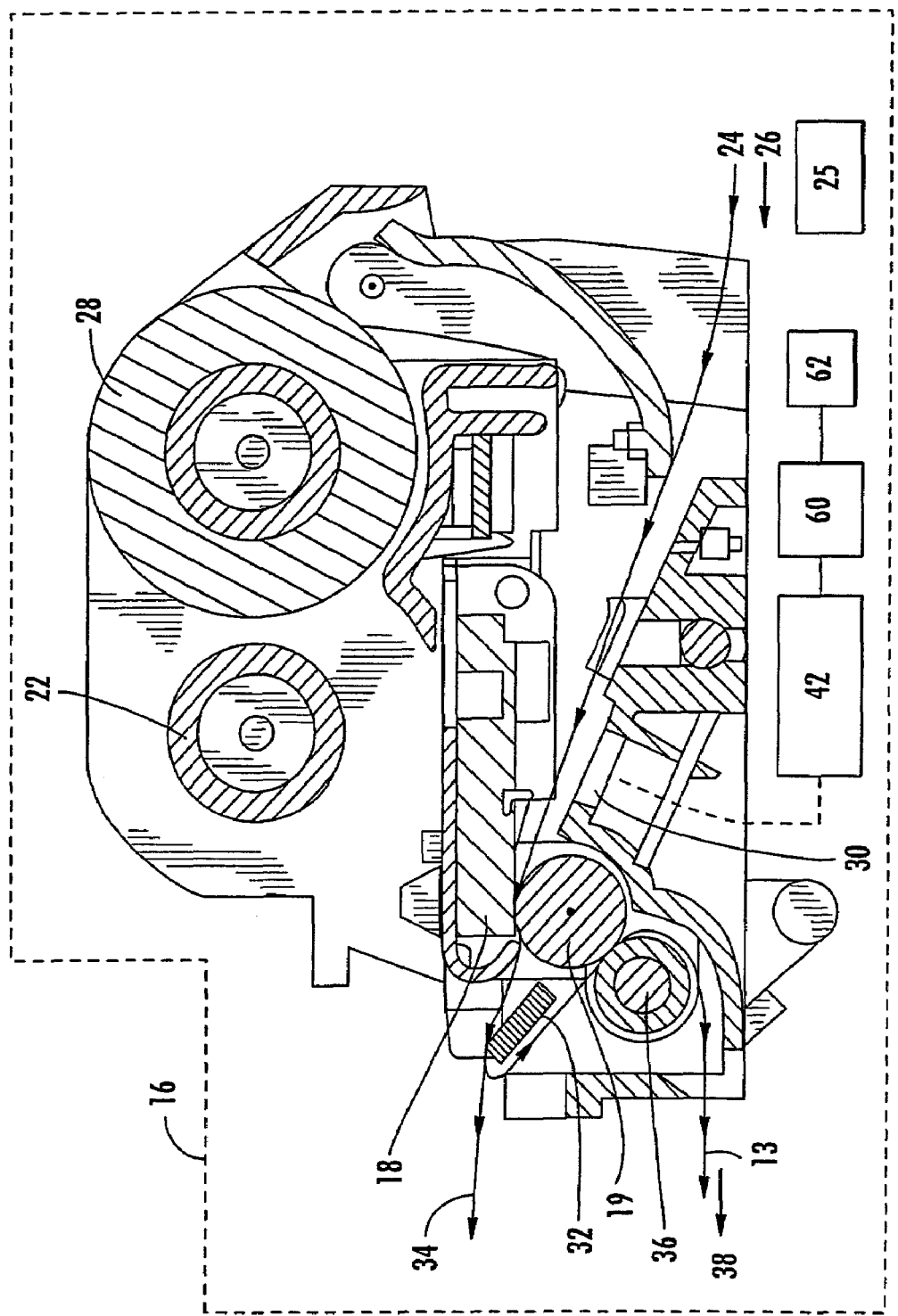
FIG. 3 is a side schematic view of a media printer according to one embodiment of the invention having an improved RFID interrogation system.

For example, an implementation of the invention in a thermal transfer media printer 16 in which both printing and transponder communication are accomplished, but at different locations in the media printer 16, is shown in FIG. 3. The media printer 16 includes a printhead sub-assembly comprising a conventional thermal printhead 18 and platen roller 19, such as a direct thermal printer for printing on thermally-sensitive media. A web 24 of media 11, such as labels, tickets, tags or cards, is directed along a feed path 26 under the printhead 18 where on-demand printing of text, bar codes and/or graphics takes place under control of a computer or microprocessor 21 in a controller 60. The controller 60 can be a printer controller that controls other functions of the printer 16, such as the operation of the print head 18, delivery of the web 24 of media 11, and the like. The controller 60 can operate according to predetermined instructions, such as a software program that is stored in a memory 62.

After being printed, the media 11 follows a media exit path 34 and may be peeled off the underlying carrier substrate 13 at a peeler bar 32. The liner or carrier substrate 13 for the media is guided out of the media printer 16 by a roller 36 where it exits the printer along a carrier exit path 38. When a thermal printer is configured for use as a thermal transfer printer, a ribbon supply roll 28 delivers a thermal transfer ribbon (not shown for clarity) between printhead 14 and the media on web 24. After use, the spent ribbon is collected on a take-up reel 22.

In accordance with an aspect of the present invention, the media printer 16 includes a transceiver 42 for generating RF communication signals that are fed to a frequency and spatially selective microstrip near field coupler 30 located proximate the media feed path 26. As will be explained and illustrated in detail hereinafter, the system (including transceiver 42 and near field coupler 30) forms a near field pattern in the location of a transponder operating region C, see FIG. 5A. The system is configured to establish at predetermined transceiver power levels a mutual coupling which exclusively activates and communicates with a single transponder 1 located in the transponder operating region C.

Notably, the term "coupler" is used herein interchangeably with the term "antenna" and neither term should be construed as excluding the other.

As labels or other media 11 with embedded transponders 1 move along the media feed path 26 under the control of the microprocessor 12 and through transponder operating region "C", data may be read from and or written to each transponder 1. Information indicia then may be printed upon an external surface of the media 11 as the media passes between the platen roller 19 and the printhead 18 by selective excitation of the heating elements in the printhead 18. When the media printer 16 is configured as a direct thermal printer, the heating elements form image dots by thermochromic color change in the heat sensitive media. When the media printer 16 is configured as a thermal transfer printer, the ink dots are formed by melting ink from the thermal transfer ribbon (not shown for clarity) delivered between printhead 18 and the media on web 24 from ribbon supply roll 28. Patterns of printed dots thus form the desired information indicia on the media 11, such as text, bar codes or graphics.

Media conveyance is well known in the art. Therefore the media conveyance 25 portion of the printer that drives the media with transponders along the media feed path 26 is not described in detail.

The near field coupler 30 according to the invention and its manner of operation will now be described with reference to FIGS. 4a-5b. One embodiment of the near field coupler 30 is configured for use, for example, with UHF RFID transponders. The RFID transponders 1 may be bulk supplied on a carrier substrate 13 attached to or embedded within label, ticket, card or tag media 11.

Figure 4A:
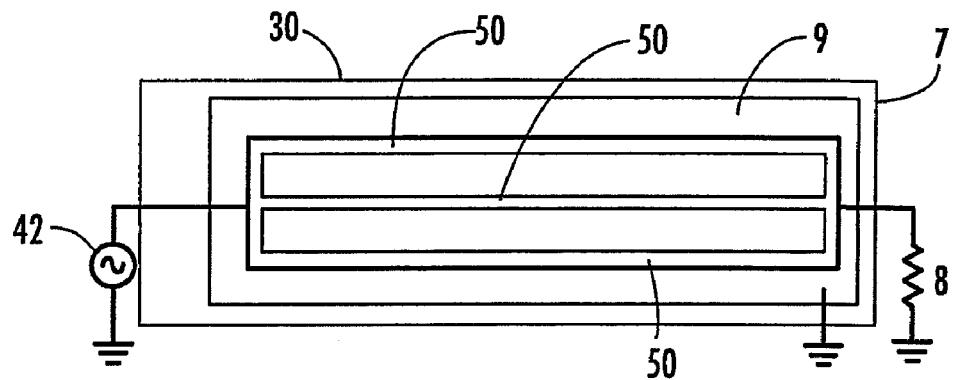
FIG. 4a is a top view of a coupler according to one embodiment of the invention.
Figure 4B:
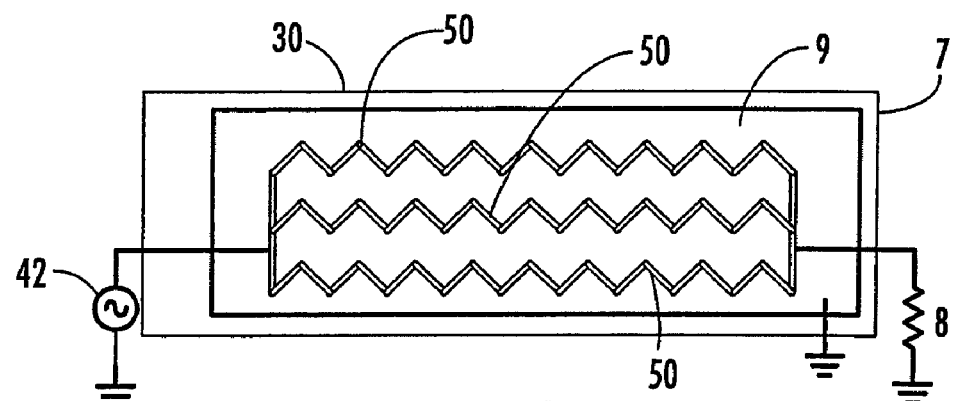
FIG. 4b is a top view of a coupler according to another embodiment of the invention.

The near field coupler 30 comprises an array of lines 50, as shown for example in FIGS. 4a and 4b. The near field coupler 30 may be configured as a segment of unmatched line 50 upon a dielectric substrate, for example a printed circuit board 7, having a ground plane 9 formed on a spaced apart isolated layer, for example the reverse side of the printed circuit board 7. One end of the array of lines 50 is connected to the transceiver 42. The other end of the array of lines 50 is connected to the ground plane 9 by means of terminating resistor 8. Rather than operating as a standing wave radiating antenna, or magnetic field generating coil, the near field coupler 30 according to the invention operates as a one half wavelength unmatched transmission line with, for example, a 15 ohm characteristic impedance that is terminated by a R=50 ohm terminating resistor 8.

Signals generated by the transceiver 42 passing along the transmission line generate a near field effect emanating from the transmission line edges that couples with a transponder 1 passing through the transponder operating region. Another description for the near field effect is "leaky", as discussed in "Leaky Fields on Microstrip" L. O. McMillian et al. Progress in Electromagnetics Research, PIER 17, 323-337, 1997 and hereby incorporated by reference in the entirety. Because the near field effect is extremely local to the transmission line and degrades at an exponential rate with increasing distance from the transmission line, the resulting transponder operating region of a single transmission line is very narrow.

Figure 5A:
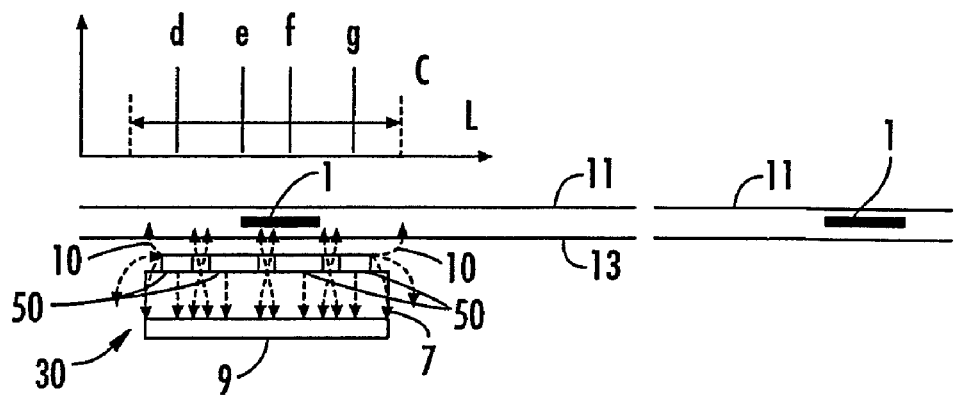
FIG. 5a is a simplified cut-away side view of a transponder-coupler structure using a coupler according to the invention, illustrating schematically the spaced apart areas where coupling with a narrow dimensioned transponder supplied in-line with other transponders on a carrier substrate may occur.

According to the invention, the prior rectangular conductive strip is therefore replaced with an array formed by a plurality of commonly fed and terminated, i.e. electrically parallel, line(s) 50, as shown for example in FIGS. 4a and 4b. The plurality of line(s) 50 therefore creates an array of leaky edges, as shown in FIG. 5a. Each leaky edge creating an electromagnetic power leakage 10 at several points within transponder operating region C. The resulting line array has similar overall width to the prior solid microstrip coupler 3 and may be similarly tuned, by adjusting the length, spacing and dielectric properties between the line(s) 50 and the ground plane 9 as well as the number of line(s) 50 and or individual line widths, shapes and inter-spacing, to adjust the overall array as an integrated single electrical structure to have the desired frequency response characteristics and generate a combined near field effect corresponding to a desired transponder operating region.

Figure 5B:
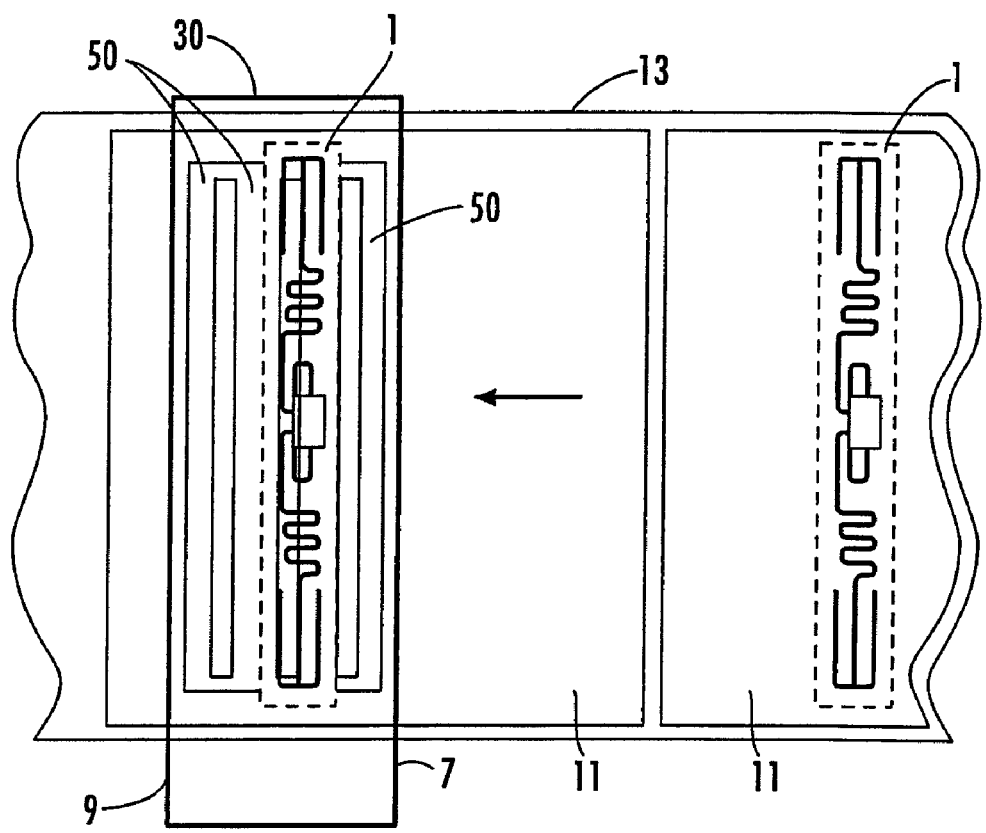

As shown by FIGS. 5a and 5b, the overall transponder operating region C resulting from a near field coupler 30 according to the invention is substantially uniform. Preferably, the distance between the coupler 30 and the web 24 is selected for critical coupling. That is, the distance is selected to be that which delivers maximum power short of being so close to the web 24 that the passing transponder(s) 1 causes the effective impedance of the coupler 30 to unacceptably vary.

In some applications, for example the modification of an existing printer configuration to add RFID read/write capability, the coupler 30 may be placed close to the web 24 due to available space and or other design considerations such as placement of the transponder operating region C proximate the printhead 18. Where the coupler 30 and the web 24 are at a close proximity to one another an impedance mismatch may occur as electrical interaction with passing transponder(s) 1 varies the effective impedance of the coupler 30. Impedance mismatch will decrease coupling range for a given output power and with significant impedance variances may cause narrow null gaps in the operational region C, for example as illustrated by d, e, f, and g in FIG. 5a, between the individual fields emitted by each line 50.

Simplified logic added to the controller 60 may be used to move the media 11 forward a small increment, for example 1-2 millimeters if a transponder 1 in the transponder operating region C falls upon a null gap and transponder communications is lost.

The null gaps and the ability to control their presence by manipulating the location of the coupler 30 with respect to the web 24, are evidence of the extremely local field concentrations produced by the near field effect and the precision with which the transponder operating region may be configured to have a wide area with sharply defined boundaries. These characteristics make the near field coupler 30 useful for eliminating precision transponder placement requirements for media suppliers, complex transponder location and tracking logic in media supply systems, as well as any requirements for shielding or increased transponder placement tolerance requirements. Further, the increased transponder operating region C provided by the present invention allows users increased freedom to place embedded transponder(s) 1 in media 11 at desired locations, for example to avoid the printing degradation that may occur when the printhead encounters a media surface irregularity due to the presence of a RFID transponder 1.

The array of lines 50 of the near field coupler 30 may be formed by a plurality of straight line(s) 50 as shown in FIG. 4a. To further tune the near field produced by the line(s) 50, a zig-zag or wiggle may be applied to each line 50, as shown for example in FIG. 4b to further reduce the appearance and/or depth of the field strength gaps d, e, f and g. For the purpose of this specification, "zig-zag" is defined as a characteristic of a line having an overall length characteristic, but a plurality of direction changes internal to the overall length of the line. The direction changes may, for example, be sharply defined or occur as smooth curves.

Alternatively, a simplified transponder 1 read and or write system may be formed without printing capabilities by positioning a near field coupler 30 coupled to a transceiver 42 proximate a media conveyance 25 moving sequential transponders 1 through a transponder operating region C. This structure is also useful where the media 11 is unprinted, or printed upon at another location.

The near field coupler 30 is not limited to a dual plane structure. For example, the near field coupler 30 may be co-planar, i.e. the ground plane and the array of lines 50 may be located, electrically isolated from each other, in the same plane of a printed circuit board but on different traces. Also, the lines 50 need not be co-planar, but may form a 3-dimensional structure. For example, the lines 50 may be on multiple layers of a printed circuit board or formed as a wire frame of lines 50 without use of printed circuit board technology.

Obviously, at some exaggerated transceiver power level, certain transponders 1 outside the transponder operating region C may be excited. However, by this invention, at appropriate power levels in the range of normal transponder read and write power levels the mutual coupling created will be highly selective for the transponder 1 in the transponder operating region C. By mapping and then applying only the required power levels for a range of both different transponder 1 types and positions within the transponder operating region C, energy consumption and potential RF interference generation may be minimized.

The spatially-selective near field property and the lack of any other shielding requirements of the near field coupler 30 according to the invention allows the economical addition of a compact, spatially-selective transponder communication module in devices such as printer-encoders.

Because the near field coupler 30 may be configured to be selective exclusively for a single transponder located in the transponder operating region C, it is now possible by this invention to use a web 24 of media having transponders which are closely spaced on the web 24, as shown for example in the figures of this specification. Prior to this invention it was extremely difficult to communicate with just one electromagnetically-coupled UHF transponder, which may have a wide number of different physical configurations, in a closely spaced series of transponders without simultaneously activating adjacent transponders.

Figure 13:
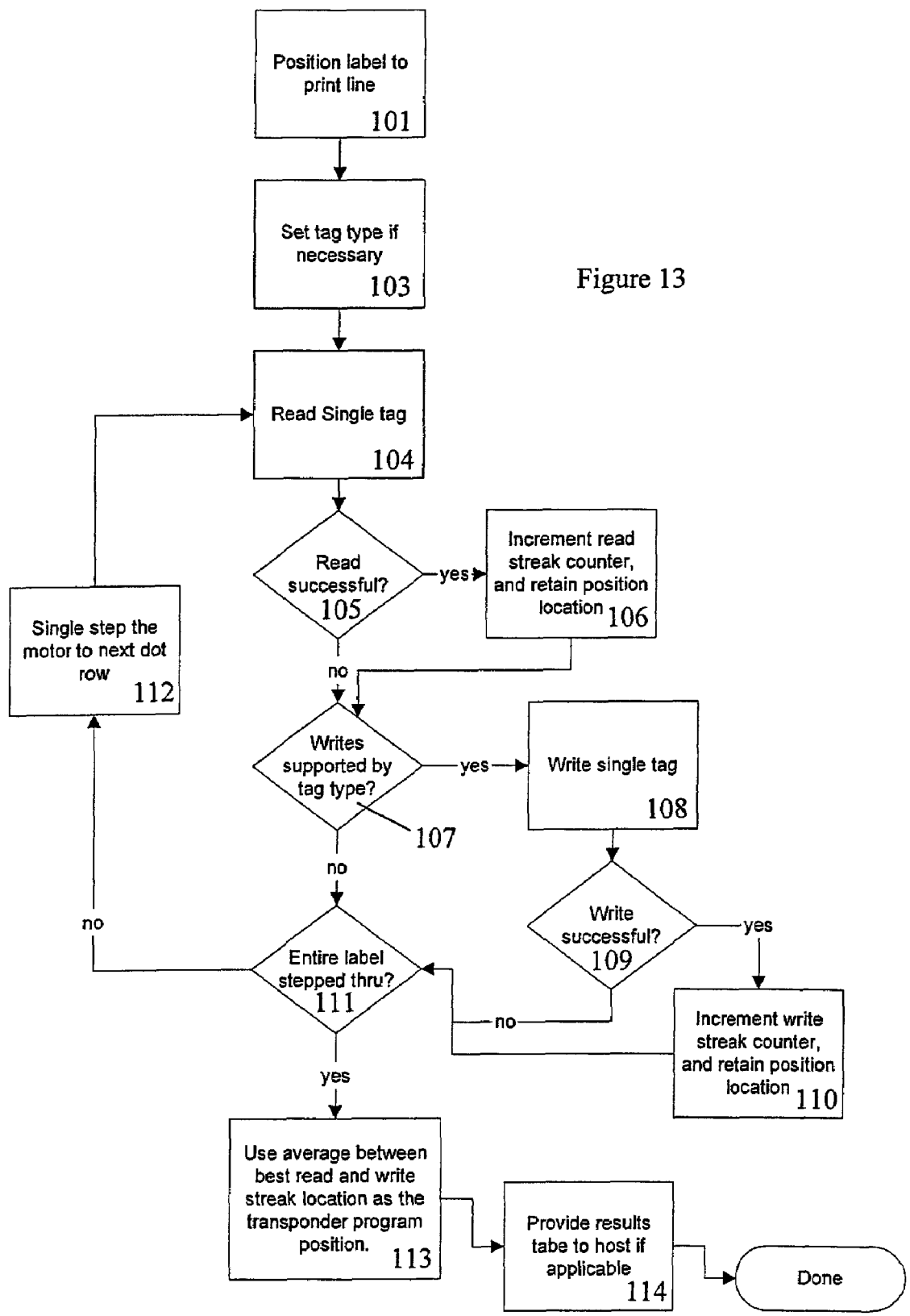
FIG. 13 is a flowchart of logic of another embodiment of the present invention for detecting a transponder location using iterative transceiver read and write attempts.

As described above, simplified logic added to the microprocessor 60 may be used to move the media 11 forward in small increments out of a null gap. The ability to move the media in small increments within the transponder operating region C, combined with the multiple lines 50, reduces the need for precise transponder placement requirements. However, according to another embodiment of the present invention, the controller 60 may include further logic, or expanded logic, to locate the transponder 1 on relatively large labels and printer media with little or no prior knowledge of the transponder location, as shown in FIG. 13. This location can then be used to calibrate the controller 60 to quickly and accurately locate successive transponders on the media web.

Figure 14:
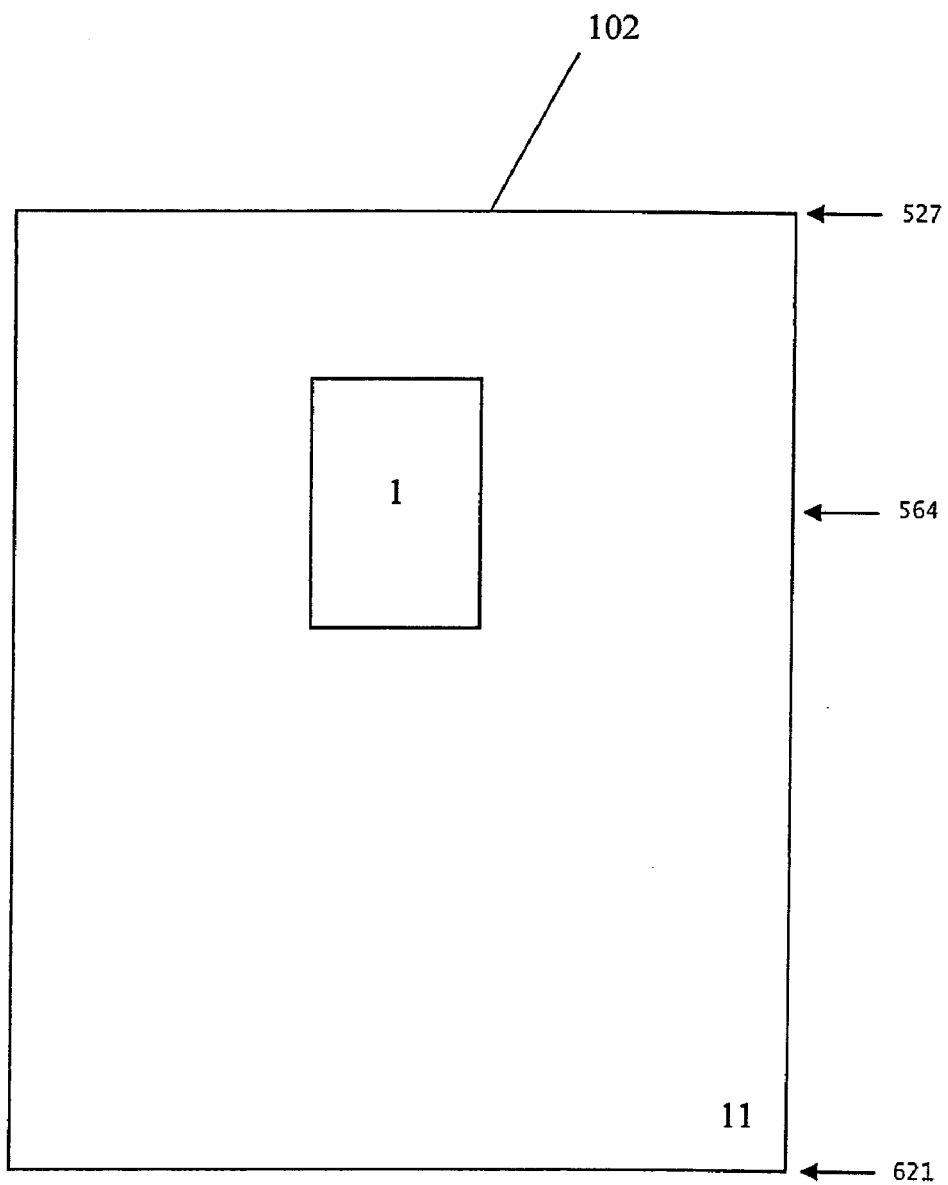
FIG. 14 is a schematic of a transponder being located using the logic of FIG. 13.

The logic includes steps that enable the controller 60 to locate the transponder 1 on the label or media 11. The term "logic" as used herein can be any combination of firmware, hardware, software, combinations of the same, etc. capable of carrying out the stated logic functions. In a print line positioning step 101, the controller 60 is configured to move to a first print line 102 on the media 11, as shown in FIG. 14. An optional tag identity input or detection step 103 includes an attempt to read the transponder 1 by a high power transceiver 42 read attempt (as explained later herein) that can read at a long enough distance to reach the transponder, or an input by the operator of the type of transponder. In instances where a faster calibration of the transponder 1 location is desired, the tag identity information will facilitate selection of power levels, frequency, and other variables affecting the read/write efficiency of the transceiver 42.

Regardless, while still at the first print line, the logic is configured to execute a read single tag step 104 wherein the controller 60 instructs the transceiver 42 to attempt a read. In a read successful query 105, the controller executes logic that determines whether the read single tag step 104 was successful. If the result is a "yes" indicating that the read step 104 was successful, the logic is configured to increment a read streak counter and retain the position location in step 106. In step 106, the controller records a successful read indicator (e.g., "R") and a position location associated with that read indicator in a memory 62, as shown in FIG. 15.

After the increment counter and retain position location step 106, or if the read single tag step 104 was not successful, the logic is configured to proceed to execute a query of whether the transponder 1 is configured for a write 107. For example, the write configuration query 107 could involve a high powered write attempt (as described in more detail below) or a study of characteristics of the type of transponder 1 detected in step 103. If the query returns a "yes," the logic is configured to execute a write single tag step 108 in which the controller powers up the transceiver 42 in an attempt to write to the transponder 1. In a write success query 109, the controller 60 is configured to execute logic to determine whether the write single tag step 108 was successful, such as by reading back the data written to the transponder 1.

If the write success query 109 returns a "yes," then the controller 60 is configured to execute the logic of an increment write streak counter and retain position location step 110. Step 110 is similar to step 106, except that the controller 60 is configured to record a successful write indicator (e.g., "W") and a position location to the memory 62, as shown in FIG. 15. At the end of step 106, or if query 109 indicates "no" for an unsuccessful write attempt, the logic is configured to execute an entire label query 111. In the query 111, the controller 60 includes logic configured to determine its current position with respect to the label or media, such as by determining the number of print lines that the label or media has advanced in comparison to its known or expected length, or a priori through some type of image analysis looking for a tear line between media.

If the query 111 indicates that the entire label has not been stepped through by returning a "no," the controller 60 logic is configured to execute a single increment of the motor to the next dot row step 112. After step 112, the controller is configured to return to step 104 for another round of read and write attempts, including recording of successes and positions thereof in steps 106 and 110 to generate the data of FIG. 15 stored in memory 62, in a continual loop until the entire label has been stepped through and query 111 generates a "yes." Step 112 may alternatively be configured to increment or move several dot rows to reduce the overall processing time of the autocalibration.

Once query 111 generate the yes, indicating that read and write attempts have been executed and recorded at every dot row of the label, the controller 60 includes logic configured to execute a streak averaging step 113 to determine the center location of the transponder 1. For example, with the data of FIG. 15, empty spaces indicate unsuccessful reads and writes, successful reads and writes are indicated by "R" and "W," and positions correspond to the index numbers on the left side of the column. In the illustrated data of FIG. 15, successive read and write is inserted at the top, shifting further reads and writes (such as the initial read and write at position 527) downward. However, the order could be reversed, or otherwise arbitrary, as long as the reads and writes are coupled with some indication of position.

Regardless, the logic of step 113 is configured to determine the midpoint of the most consecutive successful reads and writes, or just successful reads if the transponder 1 is not configured for writes. If two streaks are established, such as the 20 successful reads and writes, 4 voids and additional 20 successful reads and writes, the midpoint of the first sequence is identified. For example, step 564 on FIG. 15 is identified as the midpoint as indicated by the asterisks. Of course, preference could also be expressed for the second streak of 20, but choosing the first streak of 20 guards against the controller 60 having mistakenly advanced the label or media past its bottom edge.

Once the midpoint of the transponder 1 has been determined, the value is then used to inform logic for reading from and writing to the transponder 1 on the remaining media 11 web 24, and/or adjusting printing to provide clearance for the transponder and reduce printing artifacts. Alternatives to the midpoint of the successful reads and writes may also be used to indicate the transponder 1, such as different fractions or an arbitrary number of dot rows in from a top or bottom edge of the transponder.

In an optional results table provision step 114, the controller 60 may have logic configured to use the results of the calibration process (such as the data of FIG. 15) from the memory 62 for testing and diagnoses of problems. For example, detection of two read and write streaks may indicate a defective transponder 1 or overrun of one of the labels or media 11.

It should be noted that the ability of the present invention to detect labels is not limited to the above-described iterative, read and write attempts, but could also be extended to the use of additional transceivers 42, or variations in operation of the transceiver, such as by varying the power supplied to the transceiver. In addition, the above-described calibration logic could also have variations, such as by executing read and write attempts in grids or columns instead of rows, or by a mixture of movement of the media 11 and variation of power supplied to the transceiver 42, as described in more detail below.

In another option, if step 113 results in a location of the transponder 1 that is close, such as within ±1, 2, 4 or 6 dot rows of a standard transponder (or other distance based on the ability of varying power or frequency to increase the range of the transceiver 42) location stored in memory 62, the transponder location stored in memory may be used in lieu of the value determined in the calibration process. Also, the position of the media may be adjusted so that the standard transponder location is more accurately centered.

Generally, once the location of the transponder 1 has been identified, the media 11 can be selectively printed on, and the transponder can be read or written to, as desired. For example, split label printing could be employed wherein each successive media 11 on the web 24 is printed until the transponder 1 location is reached, the transponder is read from and/or written to, and then printing is commenced to the end of the media. Alternatively, as described below, the transponder 1 could be communicated with "on the fly" while printing is occurring, thereby accelerating the printing process.

According to another embodiment of the present invention, the controller 60 of the printer 16 can be configured to energize the transceiver 42 to different power levels for communicating with the transponders 1. The controller 60 can be configured to operate the transceiver 42 at a higher power while writing to each transponder 1 than while reading from the transponder 1. For example, in one typical operation of the printer 16, each transponder 1 is first read by the transceiver 42 and then subjected to a subsequent write/read operation. In the first read operation, the transceiver 42 can retrieve data from the transponder 1 such as the type of transponder 1, a serial number that identifies the particular transponder 1, information about the media 11 to which the transponder 1 is being attached, or the like.

In addition, the transceiver 42 can determine by the first read operation whether the transponder 1 is defective. In the subsequent write/read operation, the transceiver 42 writes data to the transponder 1 and then reads at least some of the data from the transponder 1 to verify that the transponder 1 is operating correctly, i.e., that the data was actually stored in the transponder 1 during the write operation. The controller 60 can operate the transceiver 42 at a first power level during each of the read operations, and at a second, higher power level during the write operation. The power levels for each of the reading and writing operations can be optimized to provide effective reading and writing of a particular transponder 1 without reading or writing other transponders 1 on the carrier substrate 13.

Typically, for a transponder 1 in a particular proximity with the near field coupler 30, the transceiver 42 must provide a greater power for writing to the transponder 1 than for reading from the transponder 1. That is, the power requirement for writing to the transponder 1 is higher than the power requirement for reading. Thus, according to one embodiment of the present invention, the transceiver 42 can be powered at a higher level during the writing operations so that the transceiver 42 can write to the transponder 1 whenever the transponder 1 is sufficiently close for reading by the transceiver 42 at the lower reading power.

In other words, the transceiver 42 can be configured so that the region in which the transceiver 42 can effectively write to the transponder 1 is the same, or substantially the same, as the region in which the transponder 1 can effectively read from the transponder 1. By controlling the power of the transceiver 42 in this way, the controller 60 can provide sufficient power for reading from and writing to a particular transponder 1, while preventing both reading from and writing to other transponders 1 that are outside a designated positional range.

A higher power level during the writing operation generally increases the likelihood of the transceiver 42 writing to the transponder 1, despite variations in the location and configuration of the transponder 1. As shown in FIGS. 5a and 5b and discussed above, the transponder 1 can have a relatively short dimension in the feed direction of the carrier substrate 13 so that the transponders 1 define relatively long spaces therebetween and only one transponder 1 is affected by the different leakage regions of the narrow field coupler 30. However, in other embodiments of the present invention, it may be desirable to provide the transponders 1 with different configurations and/or in different positions.

For example, as shown in FIG. 6a, each transponder 1 can extend by a greater distance in the feed direction along the feed path 26 of the printer 16, such that the space between the transponders 1 is reduced. Further, as shown in FIG. 6b, the placement of the transponders 1 on the carrier substrate 13 can be nonuniform. That is, some of the transponders 1 can be closer to one of the transverse edges of the carrier substrate 13, and/or successive transponders 1 along the carrier substrate 13 can define nonuniform distances therebetween.

In some cases, such variations and/or nonuniformities in the configuration and placement of the transponders 1 can increase the effective distance between the near field coupler 30 and the transponder 1 being read or written. By writing at a sufficiently high power, the transceiver 42 can still write to a particular one of the transponders 1 even if the transponder 1 is further from the transceiver 42. However, it is generally desirable to not use an excessive power for the writing operations, e.g., to avoid inadvertently writing to adjacent transponders 1 along the carrier substrate 13. Further, the transceiver 42 can read from the particular transponder 1 using a lower reading power to avoid reading from other transponders.

The power level of the transceiver 42 during the reading and writing operations affects the likelihood of the transceiver 42 successfully reading from or writing to the transponder 1. Generally, a range of power levels can be used for reading from or writing to each of the transponders 1. However, if the power level of the transceiver 42 during a reading or writing operation is too low, the transceiver 42 will not successfully communicate with the transponder 1, i.e., data will not be read from or written to the transponder 1. Alternatively, if the power level of the transceiver 42 is too high, the transponder 1 may be rendered inactive, and the communication will fail.

The minimum and maximum power levels of the transceiver 42 for communicating with the transponder 1 is affected by a number of characteristics of the components and operating conditions. For example, different types of transponders 1 are characterized by different antennas, chips, and operating protocols. Therefore, each type of transponder 1 typically has different requirements including the required power level of the signal from the transceiver 42 during communication. In fact, even among transponders 1 of a particular type, slight variations in the structure of each transponder 1 can affect the sensitivity of each transponder 1 and, hence, the power requirements for communication. In some cases, the power requirements for transponders 1 of the same type vary by 50% or more.

In addition, the power required for communicating with the transponder 1 is determined, in part, by the proximity of the transponder 1 to the transceiver 42 and/or the near field coupler 30. That is, if the transponder 1 is closer to the near field coupler 30, the minimum power level for communication therebetween is typically less than if the transponder 1 is farther from the near field coupler 30. If the transponders 1 are arranged nonuniformly on the carrier substrate 13 such as is illustrated in FIG. 6b, or if the carrier substrate 13 is not advanced by uniformly incremental distances along the feed path 26, varying power levels may be required for communication between the transceiver 42 and the transponders 1.

Further, the transponders 1 typically have different sensitivities at different operating frequencies. In this regard, it is noted that while the transceiver 42 operates at a nominal frequency, such as 915 MHz, the actual operating frequency of the transceiver 42 varies throughout a range of frequencies, such as between about 902 MHz and 928 MHz. Within this range, each transponder 1 may respond to signals of different power levels from the transceiver 42.

Figures 7, 8:
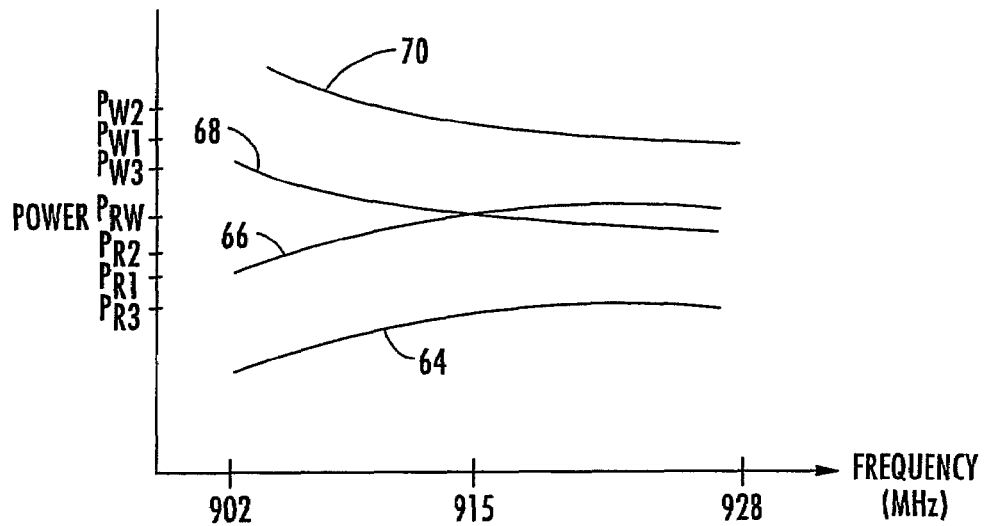
FIG. 7 is a graph illustrating the power levels at which the transceiver can communicate with an exemplary transponder at a particular distance from the transponder.
FIG. 8 is a chart illustrating a look-up table according to one embodiment of the present invention for providing values characteristic of power levels of the transceiver for communicating with particular types of transponders.

FIG. 7 illustrates the power requirements of the transceiver 42 for communicating with a particular type of transponder 1, with the transponder 1 positioned in a particular proximity to the transceiver 42. In particular, lines 64, 66 are representative of minimum and maximum power levels, respectively, for reading from the transponder 1 at a range of frequencies. That is, if the transceiver 42 is operated below the power level indicated by line 64 or above the power level indicated by line 66 for a particular frequency, the transceiver 42 will not successfully read from the transponder 1. Similarly, lines 68, 70 are representative of minimum and maximum power levels, respectively, for writing to the transponder 1 at a range of frequencies. If the transceiver 42 is operated below the power level indicated by line 68 or above the power level indicated by line 70 for a particular frequency, the transceiver 42 will not successfully write to the transponder 1.

In some cases, a single power level of the transceiver 42 can be used for reading from and writing to the transponder 1. For example, as shown in FIG. 7, maximum power level for the read operation can be greater, for some or all frequencies, than the minimum power level for the write operation. Thus, the transceiver 42 can be powered at a power level such as $P_{RW}$ that is within the acceptable ranges of power levels for at least some of the frequencies of operation for both reading and writing.

Alternatively, the transceiver 42 can be powered at one or more different levels during each of the reading and writing operations. The values can be determined according to maximize the probabilistic chance of achieving successful communication with the transponders 1. Values characteristic of the different power levels can be stored in the memory 62, such that the controller 60 can access the values during the different operations and thereby control the transceiver 42, e.g., according to the different instructions of a software program for controlling the operation of the printer 16.

During typical read and write operations, the transceiver 42 can be powered at first read and write power levels $P_{R1}$, $P_{W1}$, respectively, as indicated in FIG. 7. If a communication operation between the transceiver 42 and transponder 1 is not successful, the transceiver 42 can repeat the failed attempt at one or more different operating power levels. Of course, since the frequency typically varies throughout the operation of the transceiver 42, the subsequent attempts can also be performed at different frequencies. In this regard, FIG. 8 illustrates a look-up table that can be stored in memory 62 and which includes a number of read power levels $P_{R1}$, $P_{R2}$, $P_{R3}$, and write power levels $P_{W1}$, $P_{W2}$, $P_{W3}$.

The memory 62 can include any number of power levels for each type of operation. If the first attempt to read a transponder 1 at the first read power level $P_{R1}$ fails, the controller 60 can then operate the transceiver 42 at the second power level $P_{R2}$ during a second attempt to read the transponder 1, and then at a third power level $P_{R3}$ during a third attempt to read the transponder 1. In some cases, the controller 60 can attempt to perform the operation at each frequency more than once.

Typically, the controller 60 is configured to attempt to perform each operation no more than a predetermined maximum number of times before rejecting the transponder 1 as defective. If the operation is successful before the predetermined number of attempts is reached, the controller 60 can proceed with the next operation, such as writing to the transponder 1 or communicating with a subsequent transponder 1. Also, as shown in FIG. 8, the memory 62 can store other power levels $P_{R1}'$, $P_{R2}'$, $P_{R3}'$, $P_{W1}'$, $P_{W2}'$, $P_{W3}'$, $P_{R1}''$, $P_{R2}''$, $P_{R3}''$, $P_{W1}''$, $P_{W2}''$, $P_{W3}''$ for performing reading and writing operations with other types of transponders 1 or transducers 1 in other configurations. The write power level for a particular type of transponder 1 can be greater than the read level for the same transponder 1. For example, in one embodiment, the write power can be up to about 3 times as great as the read power. Thus, the transducer 42 can be configured to write to and read from areas that are about the same size.

Figure 9:
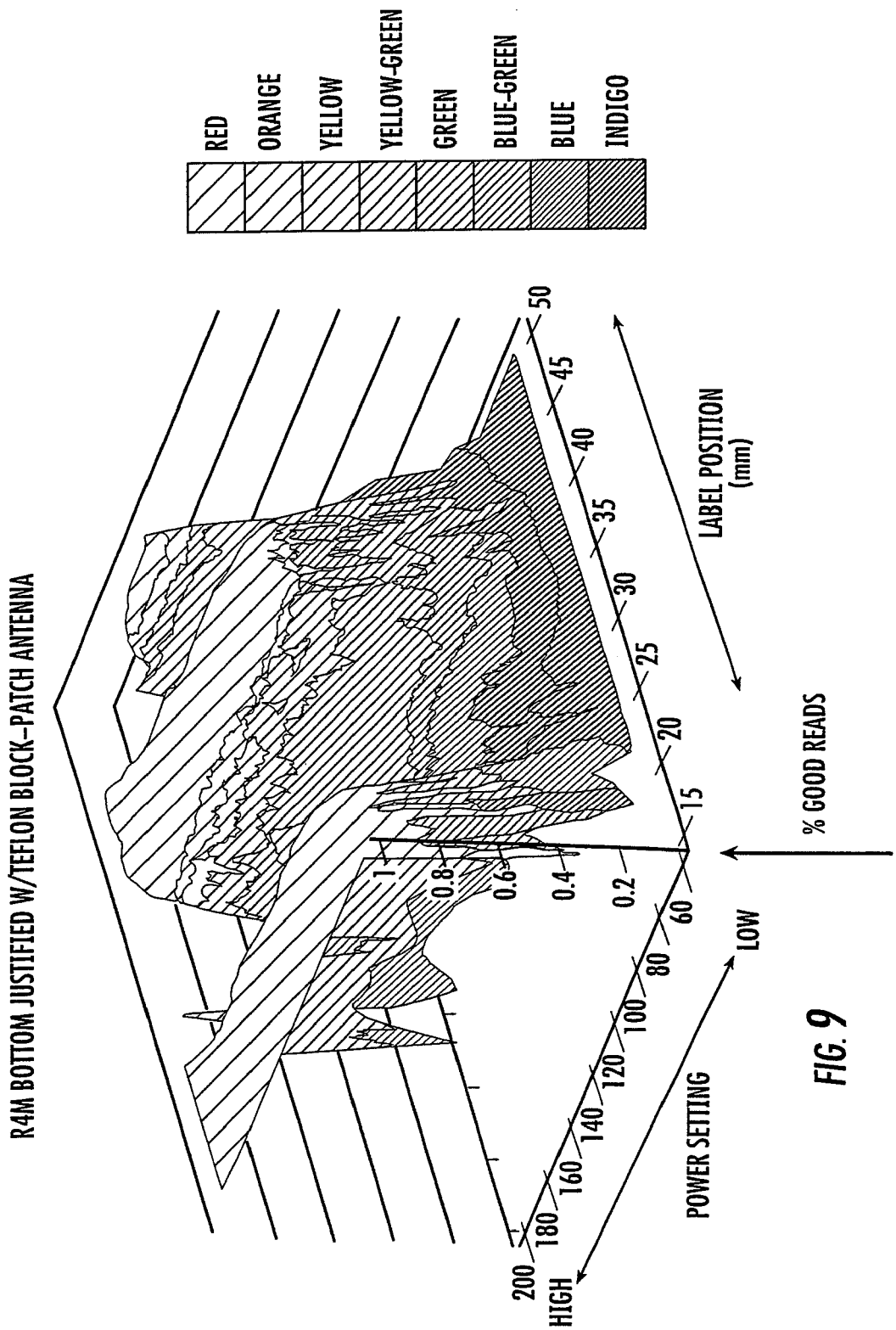
FIG. 9 is a three-dimensional chart illustrating the read success rate for a particular type of transponder at different power levels and positions relative to the transceiver.
Figure 10:
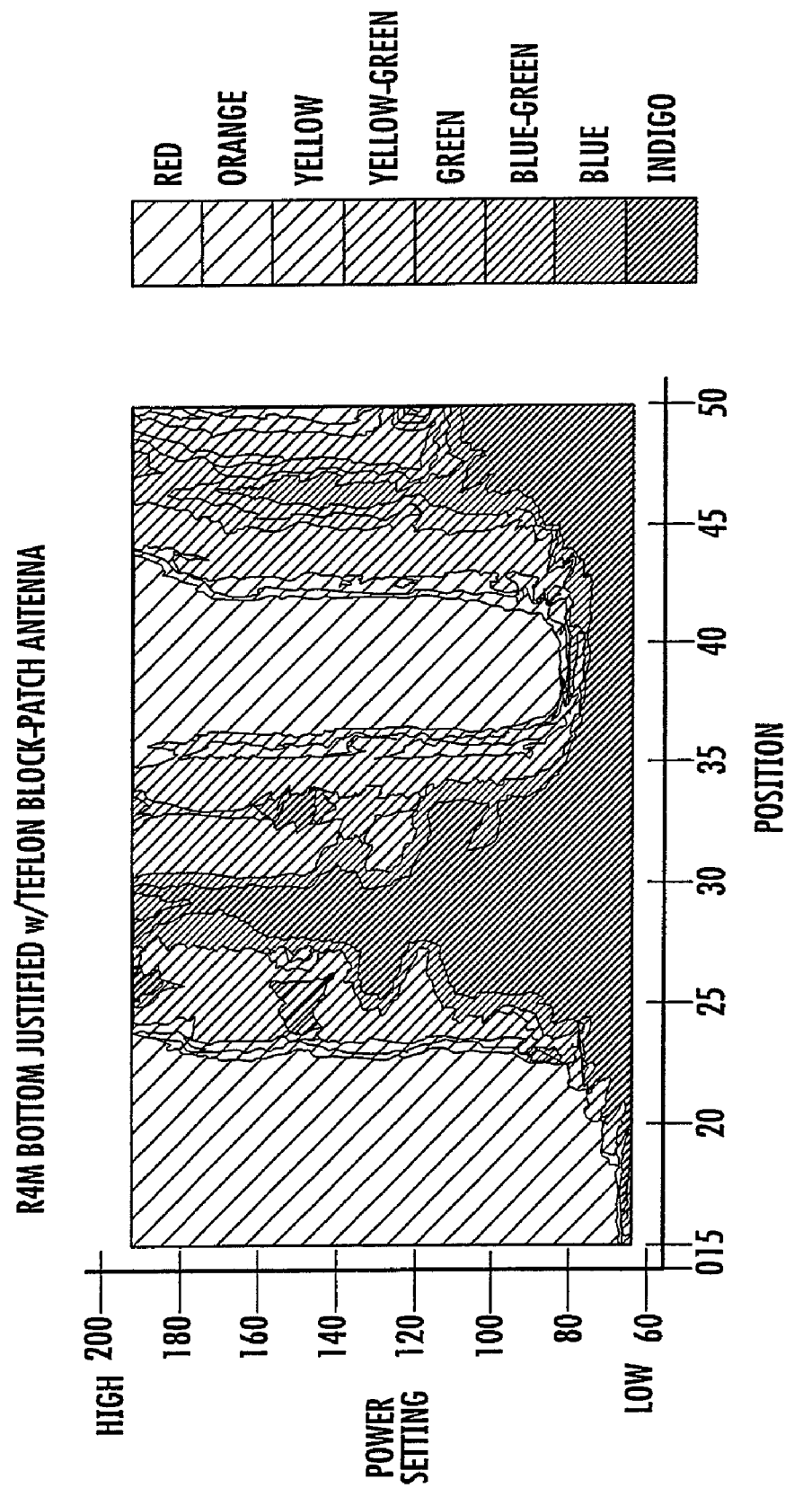
FIG. 10 is a two-dimensional chart corresponding to FIG. 9.

FIGS. 9 and 10 illustrate read success rates of a particular type of transponder 1 at different power levels and positions relative to the transceiver 42. A range of "power settings"

between 60 and 200 are indicated along a first axis of the graph, each power setting corresponding to a particular power value for the transceiver 42. The proximity of the transponder 1 relative to the transceiver 42 is indicated by the "label position" measured in millimeters along the feed path 26 of the printer 16. The read success rate is indicated along the third axis, i.e., a percent of the total attempts of reading the transponder 1.

The graph of FIG. 9 was constructed empirically by testing transponders 1 of a particular type and at the various power settings and positions. Similar data can also be determined theoretically or by other methods. FIG. 10 is a two-dimensional chart corresponding to FIG. 9. That is, the power setting and position values are indicated on the two axes, and the success rate is indicated only by shading. The shadings correspond with the rates indicated along the third axis of FIG. 9, i.e., generally ranging from low or no success to 100% success.

At certain positions, the transceiver 42 achieves high success substantially independent of the power of the transceiver 42. For example, for position values between about 15 and 23 mm, the read success rate is high except at very low power settings. Similarly, at position values between about 35 and 43 mm, the transceiver 42 communicates with high success, except at low power settings. At the highest power settings, the ranges of positions associated with high success rates are slightly larger than the ranges of positions at lower power settings.

Thus, throughout a range of power settings between about 90 and 180, a high read success rate is achieved in two significant ranges of position. However, it is also shown that a high success rate is achieved at power levels above about 130, for a position of about 50 mm. Therefore, the power setting can be limited to a range of power settings between about 90 and 110 in order to restrict the positional range of the reading operation, i.e., to prevent reading of multiple transponders 1 along the carrier substrate 13.

Figure 11:
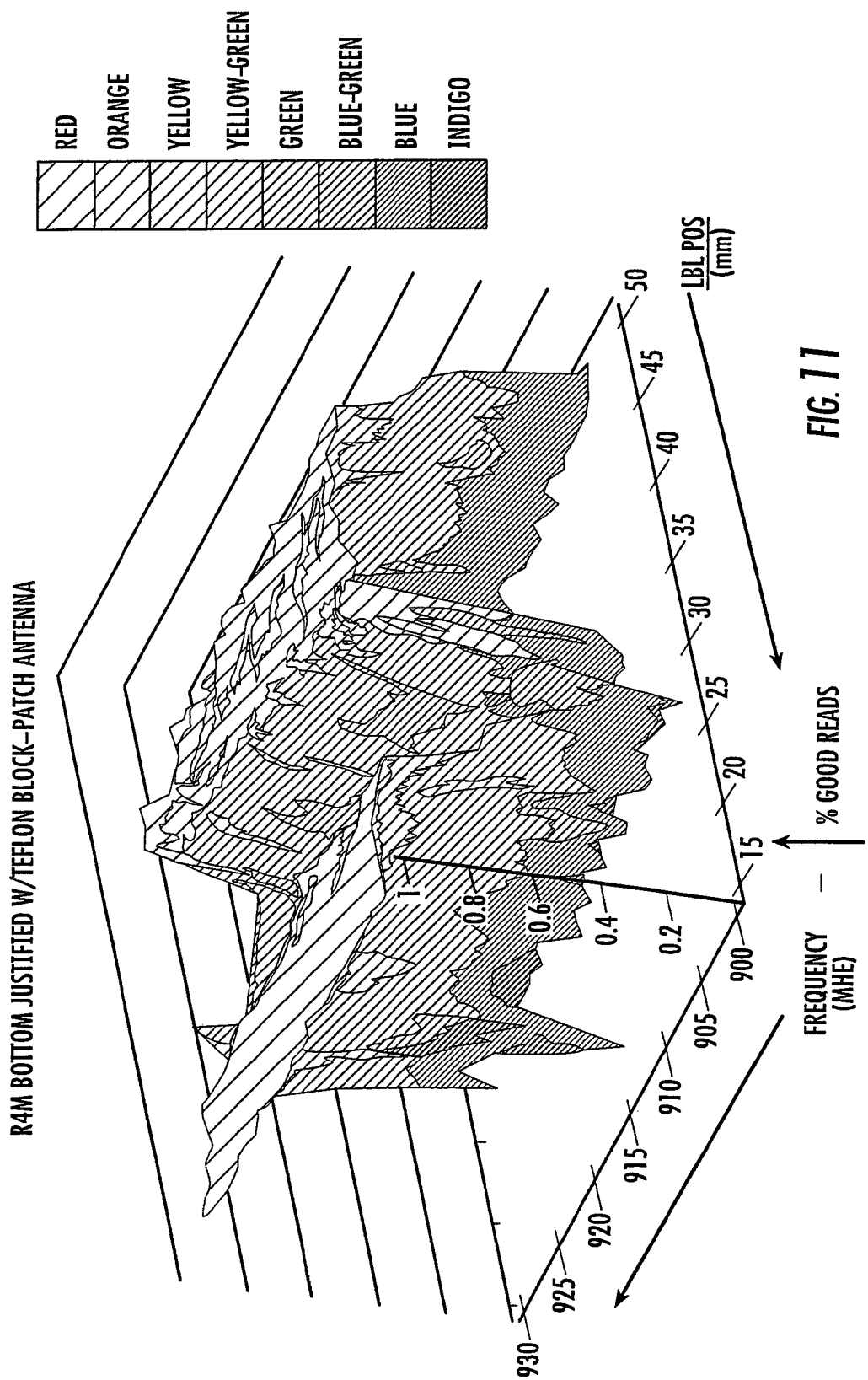
FIG. 11 is a three-dimensional chart illustrating the read success rate for a particular type of transponder at different frequencies and positions relative to the transceiver.

Similarly, FIGS. 11 and 12 illustrate read success rates of a particular type of transponder 1 at different frequency levels and positions relative to the transceiver 42. That is, FIG. 11 is a three-dimensional chart illustrating the read success rate of a particular type of transponder 1 at a particular power, throughout a range of frequencies and positions relative to the transceiver 42. FIG. 12 corresponds to FIG. 11, with the read success rate indicated only by color. At positions between about 15 and 21 mm and between about 36 and 42 mm, the read success rate is high and substantially independent of frequency.

Thus, a high read success rate can be achieved by operating the transponder 1 at a power setting of between about 90 and 110, with the transponder 1 at positions of between about 15 and 21 mm. Further, at this range of power settings, the read success rate for transponders 1 located at other positions, e.g., positions greater than about 45 mm, is low. The transceiver 42 can effectively read from a transponder 1 positioned in a relatively narrow range of positions so that communication with other transponders 1 outside the positional range is prevented.

While the foregoing graphs illustrate the significance of power, position, and frequency on the read success rate, it is appreciated that similar analysis can be conducted to determine the applicable power, position, and frequency ranges for the write success rate of the transceiver 42 for a particular type of transponder 1. In this way, a range of power levels can be determined throughout which the transceiver 42 achieves a high write success rate with a transponder 1 located in a specified position range. If the position ranges for the read and write operations are the substantially same, the transceiver 42 can read from and write to a transponder 1 located in the position range while preventing communication with transponders 1 located outside that range. Thus, even if the transponders 1 are located close to one another on the carrier substrate 13, the transceiver 42 can communicate with a particular one of the transponders 1.

In some cases, the controller 60 can be configured to operate the transceiver 42 at different power levels according to other operating parameters such as the type of transponder 1, the type of carrier substrate 13 or web 24 of media 11, and the like. For example, the sensitivity of the transponder 1 to communication signals from the transceiver 42 can be affected by the carrier substrate 13, the web 24, or other materials in close proximity to the transponder 1. However, by setting the power levels of the transceiver 42 according to these factors, the transceiver 42 can consistently achieve high communication success rates with a transponder 1 in a predetermined position along the feed path 26 while simultaneously preventing inadvertent communication with other transponders 1 on the carrier substrate 13. The controller 60 or other member of the printer can automatically detect the operating parameters, e.g., by reading data from the transponders 1, so that the controller 60 can automatically use corresponding power levels from the memory 62. Alternatively, an operator can enter operating parameters, or the printer 16 can be configured to use predetermined power level(s) regardless of the type of transponder 1 on the carrier substrate 13.

In yet another embodiment of the present invention, the controller 60 may include recalibration logic for locating the transponder 1 on the media 11 with less or no movement of the media by the controller. As noted above, raising the power level during writing operation increases the likelihood of writing to the transponder 1 even with variations in the location and configuration of the transponder. This characteristic can be used to overcome variations in the location of the transponder. However, this characteristic can also be used to extrapolate the distance of the transponder 1 from the transceiver 42.

Recapitulating observations from the embodiment described immediately above, different types of transponders with different antennas, chips, operating protocols, etc., respond differently to variation in the power levels of the transceiver 42. The power levels for reading and writing to the transponder 1 also vary based on the proximity of the transponder to the transceiver 42 and/or the near field coupler 30. Further, different transponders 1 typically have different sensitivities to different frequencies. Therefore, without being wed to theory, prior knowledge of the response profile to different power levels and frequencies from the transceiver 42 and/or the near field coupler 30, enables a calculation of the distance of the transponder 1 at what power levels or frequencies it does and doesn't respond.

Figure 16:
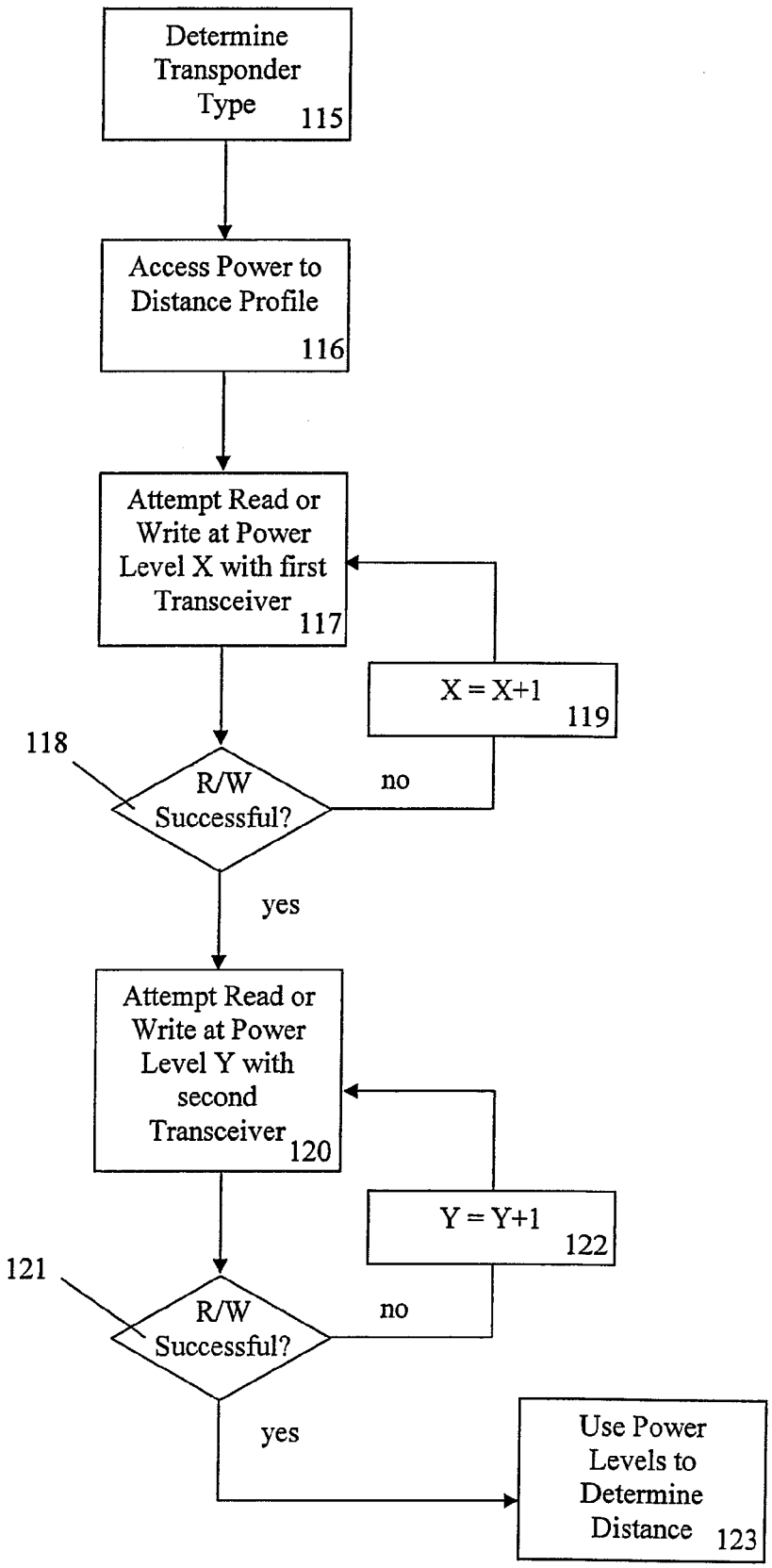
FIG. 16 is a flowchart of logic of another embodiment of the present invention for detecting a transponder location using varying a transceiver with varying power levels.

As an example, the controller 60 of the printer 16 of another embodiment of the present invention may be configured with logic illustrated in FIG. 16 to use two transceivers 42 to determine the location of the transponder 1. In a transponder type determination step 115, the transceiver 42 can perform the above-described data retrieval from the transponder 1 such as its type, a serial number that identifies the particular transponder 1, information about the media 11 to which the transponder 1 is being attached, or the like. This would typically be performed at several relatively high powers so that even a relatively far transponder 1 can at first be read. This may require cycling through several known protocols until communication is established with that particular type of transponder 1.

As noted above, values characteristic of the different power levels can be stored in the memory 62, such that the controller 60 can access the values during the different operations and thereby control the transceiver 42. In another step 116, the controller is configured to access values characteristic of the different power levels, such as the profile of the read success rates of a particular type of transponder 1 at different power levels and positions relative to the transceiver 42, as shown in FIGS. 9 and 10, based on the identity of the transponder 1 determined in step 115.

In a first transceiver 42 read or write attempt step 117, a first, preferably low, power level X is used to attempt a read of or write on the first transceiver. In a read/write success query 118, the controller 60 has logic configured to determine whether the read or write was successful. If the query 118 returns a "no," then the power level is increased in a step 119 and cycled back to step 117 for another read or write attempt in step 117. This continues until the minimum read or write power level is determined. Alternatively, if the power level is incremented downwards from the aforementioned high power level for step 115, the minimum power level is reached and the query 118 returns a "no" indicating an unsuccessful read or write to the transponder 1.

As shown in FIGS. 9 and 10, for selected distances, such as between 24 to 34 mm, there is a readability trough wherein readability drops and then increases again at about 35 mm. To account for this trough, the second transceiver 42 is cycled through its own read or write attempt step 120 at a power level Y, its own read/write success query 121 and its own power level increase step 122, until a successful read or write attempt is performed. Notably, the first and second transceivers 42 having the profiles shown in FIGS. 9 and 10, could be positioned about 34 mm apart so as to provide overlap in their respective troughs for complete coverage between them. It should also be noted that the characteristic profiles of different transceivers 42 expected for use with the media 11 may differ, so more or less transceivers at different positions may be used and still be within the scope of the present invention. It may even be possible, if the shapes of the power versus distance response curves are predictable and the distance of between the transceivers is known, to determine the distance of the transponder 11 without knowing the type of transponder 1.

In a distance determination step 123, the controller 60 includes logic configured to compare the power levels at which a successful and unsuccessful read occurred to the communication ability of the coupler and transponder at different power levels distances as stored in, and retrieved from, the memory 62 of the controller.

It should be noted that the response of the transponder 1 to the change in several different variables can be correlated to the distance of the transponder from the transceiver 42 in addition to adjustment of the amount of power. For example, the frequency, modulation depth or data rate can be varied to map the transponder 1 location.

In another embodiment, in lieu of using two separate transceivers 42, two independently, alternatively powered couplers 30 could be employed in the same transceiver. In this embodiment, the couplers 30, for example, can be radiating elements. Location of the elements is chosen in such way as to provide localized read/write ranges around each of the radiating elements, such as elements placed parallel and at some distance from each other. Each element has its own radio-frequency switch, such as either a PIN diode with bias circuit, or an integrated radio-frequency switch. These switches can be activated by an electronic signal coming from the controller 60 or can be activated by a mechanical commutator. By switching on and off one radiating element or a combination of radiating elements one can choose which elements are excited with RF signal. Therefore, the location of the read/write range relative to the location of the reference line, and/or size of the read/write range can be selected.

In still another embodiment, in a printer not having near field requirements, for example in a printer wherein the open area is larger and not invaded by metal, some type of phased array antenna may be employed. This phased array antenna can be used to steer or move its beam that generates a phase profile which is correlated to the offset location for the transponder 1. Another alternative would be to determine an area of convergence of two signals that engenders a read or write response at a specific location.

In yet another embodiment, if the transponders 1 are fairly close or the aforementioned near field requirements are not heavy, several transponders may be detected and written to without movement of the web 24 of media 11.

In another embodiment, the above-described calibration processes could be extended to three dimensions through the use of several variables or couplers 30 to triangulate the tag positions. This could be useful, for example, to detect flutter of the media 11 and its transponder 1, or media and transponders moving through varying media feed paths 26.

In another embodiment, the controller 60 is further configured to determine the top of the web 24 of media 11 as well as the location of the transponder 11 to seamlessly produce labels with RFID tags.

It should also be noted that the above-described inventions for detecting the transponder 1 location can be combined to increase accuracy or efficiency of detection. For example, multiple antennas or couplers can be used that are selectively powered at different levels to communicate with the transponder 1 and involve repeated, iterative communication attempts with intervening movement of the media 11 by the controller 60.

From another perspective, it should be noted that the calibration or location aspects of the invention could be used on every media, or selectively, instead of just when encountering a new, unrecognized media and transponder location. In addition, although the above-described invention has been described in the context of locating the transponder 1 in physical space, it also is capable of determining a set of communication link parameters at which communication with the transponder is optimal or minimal, thereby improving the function of the transceiver.

The above-described ability of the present invention to determine the location of the transponder 1 is advantageously independent of the media, allowing the media specifications to have a much wider transponder placement range. These systems can work on both small transponders placed on a small pitch, such as 1 inch labels, and large transponders. Combining calibration of the transponder 1 location with the near field coupler 30 has the advantage of locating the transponder 1 even in the presence of nearby transponders.

Additional advantages of the use of varying power and other parameters include the media 11 and transponder 1 not needing to move during calibration, allowing communication with the transponder in its native (ready for printing) rest position. This obviates the need for split label printing, wherein printing is stopped at the location of the transponder 1 for encoding, and introduces possible artifacts into the printing. Also, transponder placements out of specification in two dimensions (along the print length and print width), as well as possible media flutter in the z direction, can be detected with the present invention.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A method comprising:
    attempting a read action of a transponder associated with a media;
    determining whether the read action was successful;
    if the read action was successful then incrementing a first counter to indicate a successful read action and retaining a position location for the transponder associated with the successful read action;
    moving the media by at least one unit increment; and
    repeating the operations of attempting, determining, incrementing, and retaining for at least one iteration.

2. The method according to claim 1 further comprising attempting a write action to the transponder; determining whether the write action was successful; and if the write action was successful then incrementing a second counter to indicate a successful write action and retaining a position location for the transponder associated with the successful write action; and wherein the operation of repeating the operations of attempting, determining, incrementing and retaining for at least one iteration includes the operations of attempting, determining, incrementing and retaining associated with the read action and the operations of attempting, determining, incrementing and retaining associated with the write action.

3. The method according to claim 2, wherein a length of the media defines a series of unit increments from a first unit increment approximate a leading edge of the media to a last unit increment approximate a trailing edge of the media; and the method further comprising, after each iteration of repeating the operations of attempting, determining, incrementing and retaining, determining whether the media is at the last unit increment; if the media is not at the last unit increment, then repeating the operation of moving the media by at least one unit increment and repeating the operations of attempting, determining, incrementing, and retaining for at least one more iteration.

4. The method according to claim 3 further comprising determining a location of the transponder.

5. The method according to claim 4, wherein the operation of determining the location of the transponder is based upon at least one of the one or more retained positions associated with the one or more successful read actions and the one or more retained positions associated with the one or more successful writes.

6. The method according to claim 4, wherein the operation of determining a location of the transponder includes identifying at least one of a plurality of consecutive retained positions associated with a plurality of successful read actions and a plurality of consecutive retained positions associated with a plurality of successful writes; determining a midpoint of the plurality of consecutive retained positions; and defining the midpoint as the location of the transponder.

7. The method according to claim 6 further comprising storing the location of the transponder.

8. The method according to 3, wherein the first iteration of attempting a read action of the transponder associated with the media; determining whether the read action was successful; if the read action was successful then incrementing the first counter to indicate a successful read action and retaining a position location for the media associated with the successful read action occurs at the first unit increment.

9. The method according to claim 3, wherein a unit increment represents a print row.

10. The method according to claim 3 further comprising identifying a problem based on the retained positions.

11. An apparatus for processing a plurality of media, wherein each media includes a transponder, said apparatus comprising:
    a conveyance element for moving the plurality of media along a path;
    a transceiver and a near field coupler configured to attempt communication with a first transponder of a first media;
    a memory;
    a controller in communication with the conveyance element, the transceiver and near field coupler; the controller being configured to execute an iterative process for determining the location of the first transponder, wherein said process includes:
        instructing the transceiver to attempt a read action of the first transponder at a plurality of position locations for the first media;
        determining whether the read action was successful at each of the position locations;
        for each read action that was successful, incrementing a first counter to indicate a successful read action and retaining the position location for the first media associated with the successful read action in the memory;
        instructing the conveyance element to move the first media to the position locations;
        determining the location of the transponder relative to the first media based upon the retained position locations.

12. The apparatus according to claim 11, wherein the iterative process further includes instructing the transceiver to attempt a write action to the first transponder at each of the plurality of position locations for the first media; determining whether the write action was successful at each of the position locations; for each write action that was successful, incrementing a second counter to indicate a successful write action and retaining the position location for the first media associated with the successful write action in the memory; and wherein the operation of determining the location of the first transponder based upon the retained position locations include at least one of one or more retained positions associated with one or more successful read actions and one or more retained positions associated with one or more successful write actions.

13. The apparatus according to claim 12, wherein the operation of determining a location of the first transponder based upon at least one of the one or more retained positions associated with the one or more successful read actions and the one or more retained positions associated with the one or more successful write actions is further based upon identifying at least one of a plurality of consecutive retained positions for a plurality of consecutive successful read actions and a plurality of consecutive retained positions for a plurality of consecutive successful write actions.

14. The apparatus according to claim 13, wherein the operation of determining the location of the first transponder further includes defining a midpoint of the plurality of consecutive retained positions as the location of the first transponder.

15. An apparatus for determining a communication location of a transponder associated with a media, the apparatus comprising:
- a transceiver and a near field coupler configured to communicate with the transponder; and the near field coupler configured to operate as a one half wavelength unmatched transmission line; and
- a controller connected in communication with the transceiver, the controller configured to instruct the transceiver and the near field coupler to attempt to communicate with the transponder at a plurality of position locations of the media relative to the near field coupler; to determine whether each attempt to communicate was successful and retain a position location associated with each successful attempt; and to determine the location of the transponder relative to the near field coupler based upon the one or more retained position locations associated with a successful attempt.

16. The apparatus according to claim 15, wherein the near field coupler includes an array of spaced lines terminated by a load.

17. The apparatus according to claim 15, wherein each attempt to communicate includes attempting at least one of an attempt to read from the transponder and an attempt to write to the transponder.

18. The apparatus according to claim 15, wherein the controller is further configured to identify a plurality of consecutive retained positions associated with a plurality of consecutive successful attempts to communicate and to define a midpoint of the plurality of consecutive retained positions as the location of the transponder.

19. The apparatus according to claim 15, wherein the controller is further configured to identify a problem of the transponder based on the attempt to communicate with the transponder at a plurality of position locations.

20. The apparatus according to claim 15, wherein the controller is further configured to store the location of the transponder in the memory.

21. The apparatus according to claim 20, wherein the controller instructs the transceiver and the near field coupler to attempt to communicate with a plurality of subsequent transponders at least partially based on the stored location.

22. The apparatus according to claim 15, wherein an attempt to communicate includes an attempt to read from the transponder and an attempt to write to the transponder and wherein the controller is further configured to instruct the transceiver and the near field coupler to attempt to read from the transponder at a first power level and attempt to write to the transponder at a second power level, wherein the first power level differs from the second power level.

23. A combination of the apparatus according to claim 15 and an assembly line for conveying a plurality of items, wherein each item includes a media having a transponder.

* * * * *